US012267296B2

(12) United States Patent
Sarathchandra et al.

(10) Patent No.: US 12,267,296 B2
(45) Date of Patent: Apr. 1, 2025

(54) WIRELESS TRANSMIT/RECEIVE UNIT (WTRU) TO WTRU RELAY MEDIA ACCESS CONTROL (MAC) ACCESS CONFLICT SUPPORT

(71) Applicant: InterDigital Patent Holdings, Inc., Wilmington, DE (US)

(72) Inventors: Magurawalage Chathura Madhusanka Sarathchandra, London (GB); Michelle Perras, Montreal (CA); Jung Je Son, Warrington, PA (US); Samir Ferdi, Kirkland (CA); Taimoor Abbas, Sainte-Julie (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 18/773,038

(22) Filed: Jul. 15, 2024

(65) Prior Publication Data
US 2025/0030661 A1    Jan. 23, 2025

Related U.S. Application Data

(60) Provisional application No. 63/527,379, filed on Jul. 18, 2023.

(51) Int. Cl.
*H04L 61/5046*    (2022.01)
*H04L 61/103*    (2022.01)
(Continued)

(52) U.S. Cl.
CPC ...... *H04L 61/5046* (2022.05); *H04L 61/5007* (2022.05); *H04L 61/103* (2013.01); *H04L 2101/622* (2022.05)

(58) Field of Classification Search
CPC ............ H04L 2101/622; H04L 61/103; H04L 61/5007; H04L 61/5046
(Continued)

(56) References Cited

U.S. PATENT DOCUMENTS 9,386,445 B2    7/2016 Koo et al.
2003/0177267 A1*    9/2003 Orava ................. H04L 63/0407
                                                                709/245
(Continued)

FOREIGN PATENT DOCUMENTS

| WO | WO 2021/163507 A1 | 8/2021 |
| WO | 2022150538 A1 | 7/2022 |
| WO | WO 2023/014805 A1 | 2/2023 |

OTHER PUBLICATIONS

3rd Generation Partnership Project; "Technical Specification Group Services and System Aspects; Proximity based Services (ProSe) in the 5G System (5GS); (Release 18)", 3GPP TS 23.304 V18.1.0, Mar. 2023, 143 pages.
(Continued)

*Primary Examiner* — David P Zarka
(74) *Attorney, Agent, or Firm* — Flaster Greenberg P.C.

(57) ABSTRACT

A relay node may detect conflicts regarding media access control (MAC) addresses. A source node may send a request to the relay node. The request may be a request to establish communications with a target node. The source may send, to the relay node, an indication of the MAC address of the source node. The source node may receive a reject message from the relay node. The reject message may comprise an indication of a conflict associated with the MAC address of the source node.

10 Claims, 14 Drawing Sheets

(51) Int. Cl.
*H04L 61/5007* (2022.01)
*H04L 101/622* (2022.01)

(58) Field of Classification Search
USPC .......................................................... 709/224
See application file for complete search history.

(56) References Cited

U.S. PATENT DOCUMENTS

| | | |
|---|---|---|
| 2008/0107015 A1 | 5/2008 | Cho et al. |
| 2009/0238108 A1 | 9/2009 | Nakae et al. |
| 2014/0355617 A1 | 12/2014 | Brown et al. |
| 2015/0281947 A1* | 10/2015 | Patil ........................ H04W 8/26 370/329 |
| 2018/0077742 A1 | 3/2018 | Pang |
| 2018/0263078 A1 | 9/2018 | Asakura et al. |
| 2021/0112007 A1* | 4/2021 | Huang .................... H04L 45/38 |
| 2021/0185521 A1* | 6/2021 | Purkayastha ......... H04W 12/50 |
| 2021/0282195 A1* | 9/2021 | Paladugu ............. H04W 72/20 |
| 2021/0329637 A1 | 10/2021 | Chen et al. |
| 2021/0337509 A1 | 10/2021 | Selvanesan et al. |
| 2021/0400747 A1 | 12/2021 | Kuo |
| 2022/0132307 A1* | 4/2022 | Perras ..................... H04W 4/40 |
| 2022/0141178 A1 | 5/2022 | Suzuki |
| 2022/0159444 A1 | 5/2022 | Newman et al. |
| 2022/0295337 A1 | 9/2022 | Kim et al. |
| 2023/0032220 A1* | 2/2023 | Guo ...................... H04W 12/50 |
| 2023/0036235 A1 | 2/2023 | Park et al. |
| 2023/0042442 A1* | 2/2023 | Kim .................... H04L 63/0876 |
| 2023/0071287 A1* | 3/2023 | Ahmad ................. H04L 63/162 |
| 2023/0077297 A1 | 3/2023 | Fu et al. |
| 2023/0099812 A1* | 3/2023 | Ahmad ............... H04W 12/037 455/11.1 |
| 2023/0109855 A1* | 4/2023 | Chun ...................... H04W 4/42 370/329 |
| 2023/0164571 A1* | 5/2023 | Zhang ................... H04W 76/14 726/2 |
| 2023/0209618 A1 | 6/2023 | Fu |
| 2023/0224702 A1 | 7/2023 | Kim et al. |
| 2023/0388785 A1* | 11/2023 | Ferdi .................. H04W 12/041 |
| 2024/0015818 A1 | 1/2024 | Kuo |
| 2024/0129968 A1* | 4/2024 | Perras ................... H04W 76/15 |
| 2024/0172330 A1 | 5/2024 | Yang et al. |
| 2024/0305980 A1* | 9/2024 | Ferdi ..................... H04W 76/14 |
| 2024/0349084 A1* | 10/2024 | Perras ................... H04W 36/16 |
| 2025/0030662 A1 | 1/2025 | Sarathchandra et al. |

OTHER PUBLICATIONS

Zuniga, JC., et al., "Randomized and Changing MAC Address", Draft-ietf-madinas-mac-address-randomization-randomization-06, Mar. 11, 2023, 15 pages.

3rd Generation Partnership Project; "Remaining issue on ProSe one to one Communication Layer-2 ID", ZTE, R2-156610, Nov. 16-20, 2015, 4 pages.

3rd Generation Partnership Project; "Technical Specification Group Core Network and Terminals; Proximity-services (ProSe) User Equipment (UE) to ProSe function protocol aspects; Stage 3 (Release 17)", 3GPP TS 24.334 17.2.0, Jun. 2021, 264 pages.

3rd Generation Partnership Project; "Technical Specification Group Services and System Aspects; Proximity based Services (ProSe) in the 5G System (5GS) (Release 18)", 3GPP TS 23.304 V18.2.0, Jun. 2023, 142 pages.

3rd Generation Partnership Project; "Support for Ethernet Traffic via 5G ProSe Layer-3 UE-to-UE Relay-Non-unique MAC Address at the Source Side", Ericsson, C1-233457, 3GPP TSG-CT WG1 Meeting #142, May 22-26, 2023, 15 pages.

* cited by examiner

WIRELESS TRANSMIT/RECEIVE UNIT (WTRU) TO WTRU RELAY MEDIA ACCESS CONTROL (MAC) ACCESS CONFLICT SUPPORT

CROSS REFERENCE TO RELATED APPLICATIONS

This application claims the benefit of U.S. Provisional Patent Application No. 63/527,379, filed Jul. 18, 2023, which is hereby incorporated herein by reference in its entirety.

BACKGROUND

Existing procedures allow the establishment of a PC5 link between a source end user equipment (UE) and a target end UE via a UE-to-UE (U2U) Relay, even if the MAC (media access control or medium access control) address of the source end UE is not unique. Moreover, the PC5 link may be established even when a MAC address conflict is detected. As such, upon receiving traffic with a non-unique destination MAC address, the Relay may not be able to determine to which PC5 link the traffic should be forwarded. This may result in the Relay forwarding the traffic to the wrong source UE or dropping traffic with non-unique MAC address.

SUMMARY

A UE also may be referred to herein as a wireless transmit/receive unit (WTRU). Throughout the Specification and Figures, the terms UE and WTRU may be used interchangeably. A Relay may be referred to as a Relay node. Throughout the Specification and Figures, the terms Relay and Relay node may be used interchangeably. A Relay may comprise a WTRU, UE, or any appropriate apparatus. Described herein are methods and apparatuses for UE-to-UE (also referred to at WTRU-to-WTRU or U2U) Relay MAC access conflict support. The terms Relay and Relay node may be used interchangeably.

As described herein according to various examples, a Relay node may detect a conflict with a source end WTRU's media access control (MAC) address. The conflict may be indicative of the MAC address not being unique. The Relay may request a new MAC address from the source end WTRU. The Relay may assign a new MAC address to the source end WTRU. The source end WTRU may provide a list of MAC addresses and the Relay may select a MAC address from the list. Selection from the list may be accomplished, for example, during PC5 link establishment. The Relay may detect a conflict with a target end WTRU's MAC address. The Relay may request a new MAC address from the target end WTRU. The Relay may trigger a link identifier update (LIU) procedure with the target end WTRU. The Relay may release a current PC5 link and restart the PC5 link establishment procedure. The Relay may assign a new MAC address to the target end WTRU after PC5 link establishment. The target end WTRU may provide a list of MAC address. The Relay may select the target end WTRU's MAC address following PC5 link establishment. A source end WTRU may detect a MAC address conflict. The source end WTRU may associate a new MAC address with target end WTRU. The source end WTRU may release PC5 links. A target end WTRU may a detect MAC address conflict. The target WTRU may send a list of MAC address for the source end WTRU. The Relay may update the list before sending it to the source end WTRU. Communicating WTRUs may negotiate a MAC address values. Each WTRU (e.g., initiating and target WTRUs) may generate partial MAC addresses for creating the complete MAC address.

An example method for managing MAC address conflicts may be performed by a Relay node. The method may comprise the Relay node receiving a direct communication request (DCR) message from a wireless transmit/receive unit (WTRU). The Relay node may send a direct security mode (DSM) command message to the WTRU. The Relay node may receive a DSM complete message from the WTRU, wherein the DSM complete message comprises a first media access control (MAC) address associated with the WTRU. The Relay node may determine that the first MAC address associated with the WTRU is not unique. The Relay node may send a PC5 request message to the WTRU, wherein the PC5 request message comprises a request for a new MAC address. The Relay node may receive a PC5 response message from the WTRU, wherein the PC5 response message comprises an indication of a second MAC address. The Relay node may determine that the second MAC address is unique. The Relay node may send a direct communication accept (DCA) message to the WTRU, wherein the DCA message may comprise an indication that second MAC address is associated with the first WTRU. The received indication of the second MAC address may comprise a new MAC address.

An example method for managing MAC address conflicts may be performed by a Relay node. The Relay node may establish a link with a first wireless transmit/receive unit (WTRU). The Relay node may receive a first media access control (MAC) address associated with the first WTRU. The Relay node may establish a link with a second WTRU. The Relay node may receive a second MAC address associated with the second WTRU. The Relay node may determine a conflict between the first MAC address and the second MAC address. The Relay node may request a new MAC address from the second WTRU. The Relay node may receive a third MAC address from the second WTRU. The Relay node may establish a link with the second WTRU based on the third MAC address.

An example Relay node configured to managing MAC address conflicts may comprise a transceiver and a processor. The processor may be configured to receive, via the transceiver, a direct communication request (DCR) message from a wireless transmit/receive unit (WTRU). The processor may be configured to send, via the transceiver, a direct security model (DSM) command message to the WTRU. The processor may be configured to receive, via the transceiver, a DSM complete message from the WTRU, wherein the DSM complete message comprises a first media access control (MAC) address associated with the WTRU. The processor may be configured to determine that the first MAC address associated with the WTRU is not unique. The processor may be configured to send, via the transceiver, a PC5 request message to the WTRU, wherein the PC5 request message comprises a request for a new MAC address. The processor may be configured to receive, via the transceiver, a PC5 response message from the WTRU, wherein the PC5 response message comprises an indication of a second MAC address. The processor may be configured to determine that the second MAC address is unique. The processor may be configured to send, via the transceiver, a direct communication accept (DCA) message to the WTRU, wherein the DCA message comprises an indication that second MAC address is associated with the first WTRU. The received indication of the second MAC address may comprise a new MAC address.

An example Relay node configured to managing MAC conflicts may comprise a transceiver and a processor. The processor may be configured to establish, via the transceiver, a link with a first wireless transmit/receive unit (WTRU). The processor may be configured to receive, via the transceiver, a first media access control (MAC) address associated with the first WTRU. The processor may be configured to establish, via the transceiver, a link with a second WTRU. The processor may be configured to receive, via the transceiver, a second MAC address associated with the second WTRU. The processor may be configured to determine a conflict between the first MAC address and the second MAC address. The processor may be configured to request, via the transceiver, a new MAC address from the second WTRU. The processor may be configured to receive, via the transceiver, a third MAC address from the second WTRU. The processor may be configured to establish, via the transceiver, a link with the second WTRU based on the third MAC address.

At least one example computer-readable storage medium for managing MAC address conflicts may comprise executable instructions, wherein the at least one computer-readable storage medium in not a transitory signal. The executable instructions, when executed, may configure at least one processor to establish a link with a first wireless transmit/receive unit (WTRU). Execution of the instruction may configure the at least one processor to receive a first media access control (MAC) address associated with the first WTRU. Execution of the instructions may configure the at least one processor to establish a link with a second WTRU. Execution of the instructions may configure the at least one processor to receive a second MAC address associated with the second WTRU. Execution of the instructions may configure the at least one processor to determine a conflict between the first MAC address and the second MAC address. Execution of the instructions may configure the at least one processor to request a new MAC address from the second WTRU. Execution of the instructions may configure the at least one processor to receive a third MAC address from the second WTRU. Execution of the instructions may configure the at least one processor to establish a link with the second WTRU based on the third MAC address.

At least one example computer-readable storage medium for managing MAC address conflicts may comprise executable instructions, wherein the at least one computer-readable storage medium in not a transitory signal. The executable instructions, when executed, may configure at least one processor to receive a direct communication request (DCR) message from a wireless transmit/receive unit (WTRU). Execution of the instructions may configure the at least one processor to send a direct security model (DSM) command message to the WTRU. Execution of the instructions may configure the at least one processor to receive a DSM complete message from the WTRU, wherein the DSM complete message comprises a first media access control (MAC) address associated with the WTRU. Execution of the instructions may configure the at least one processor to determine that the first MAC address associated with the WTRU is not unique. Execution of the instructions may configure the at least one processor to send a PC5 request message to the WTRU, wherein the PC5 request message comprises a request for a new MAC address. Execution of the instructions may configure the at least one processor to receive a PC5 response message from the WTRU, wherein the PC5 response message comprises an indication of a second MAC address. Execution of the instructions may configure the at least one processor to determine that the second MAC address is unique. Execution of the instructions may configure the at least one processor to send a direct communication accept (DCA) message to the WTRU, wherein the DCA message comprises an indication that second MAC address is associated with the first WTRU. The received indication of the second MAC address may comprise a new MAC address.

An example first WTRU for performing WTRU to WTRU communications may comprise a transceiver and a processor. The processor may be configured to receive, via the transceiver, a direct communication request (DCR) message from a second WTRU. The DCR message may comprise an indication of a request for the first WTRU to establish a link with a third WTRU. The link may be configured to relay traffic to and from the second WTRU to the third WTRU. The processor may be configured to send, via the transceiver, a direct security mode (DSM) command message to the second WTRU. The processor may be configured to receive, via the transceiver, a response message from the second WTRU. The response message may comprise an indication of a medium access control (MAC) address associated with second WTRU. The processor may be configured to detect a MAC address conflict associated with the MAC address of the second WTRU. The processor may be configured to send, via the transceiver, a direct communication (DC) reject message to the second WTRU based on the detection of the MAC address conflict associated with the MAC address of the second WTRU. The DC reject message may comprise a cause code indicative of a MAC address conflict associated with the MAC address of the second WTRU (e.g., cause code indicating that the MAC address of the second WTRU is not unique). The response message may comprise a DSM complete message. The DSM command message may be configured to establish a secure link between the first WTRU and the second WTRU. The MAC address conflict associated with the MAC address of the second WTRU may correspond to the MAC address of the second WTRU being used by another WTRU associated with the first WTRU. The processor may be configured to, subsequent to sending the DC reject message, receive a second DCR message from the second WTRU. The second DCR message may comprise an indication of a second request for the first WTRU to establish a link with a third WTRU. The processor may be configured to send a second DSM command message to the second WTRU. The processor may be configured to receive a second response message from the second WTRU. The second response message may comprise a DSM complete message, The second response message may comprise an indication of a second MAC address of the second WTRU.

An example method for performing WTRU to WTRU communications may be performed by a first WTRU. The method may comprise receiving a direct communication request (DCR) message from a second WTRU. The DCR message may comprise an indication of a request for the first WTRU to establish a link with a third WTRU. The link may be configured to relay traffic to and from the second WTRU to the third WTRU. The method may comprise sending a direct security mode (DSM) command message to the second WTRU. The method may comprise receiving a response message from the second WTRU. The response message may comprise an indication of a medium access control (MAC) address associated with second WTRU. The method may comprise detecting a MAC address conflict associated with the MAC address of the second WTRU. The method may comprise sending a direct communication (DC) reject message to the second WTRU based on the detection of the MAC address conflict associated with the MAC address of the second WTRU. The DC reject message may comprise a cause code indicative of a MAC address conflict associated with the MAC address of the second WTRU (e.g., cause code indicating that the MAC address of the second WTRU is not unique). The response message may comprise a DSM complete message. The DSM command message may be configured to establish a secure link between the first WTRU and the second WTRU. The MAC address conflict associated with the MAC address of the second WTRU may correspond to the MAC address of the second WTRU being used by another WTRU associated with the first WTRU. The method may comprise, subsequent to sending the DC reject message, receiving a second DCR message from the second WTRU. The second DCR message may comprise an indication of a second request for the first WTRU to establish a link with a third WTRU. The method may comprise sending a second DSM command message to the second WTRU. The method may comprise receiving a second response message from the second WTRU. The second response message may comprise a DSM complete message. The second response message may comprise an indication of a second MAC address of the second WTRU.

At least one example non-transitory computer-readable storage medium may comprise executable instructions for configuring at least one processor to perform WTRU to WTRU communications. The executable instructions may configure at least one processor to receive, by a first WTRU, a direct communication request (DCR) message from a second WTRU. The DCR message may comprise an indication of a request for the first WTRU to establish a link with a third WTRU. The link may be configured to relay traffic to and from the second WTRU to the third WTRU. The executable instructions may configure at least one processor to send a direct security mode (DSM) command message to the second WTRU. The executable instructions may configure at least one processor to receive a response message from the second WTRU. The response message may comprise an indication of a medium access control (MAC) address associated with second WTRU. The processor may be configured to detect a MAC address conflict associated with the MAC address of the second WTRU. The processor may be configured to send, via the transceiver, a direct communication (DC) reject message to the second WTRU based on the detection of the MAC address conflict associated with the MAC address of the second WTRU. The DC reject message may comprise a cause code indicative of a MAC address conflict associated with the MAC address of the second WTRU (e.g., cause code indicating that the MAC address of the second WTRU is not unique). The response message may comprise a DSM complete message. The DSM command message may be configured to establish a secure link between the first WTRU and the second WTRU. The MAC address conflict associated with the MAC address of the second WTRU may correspond to the MAC address of the second WTRU being used by another WTRU associated with the first WTRU. The executable instructions may configure at least one processor to, subsequent to sending the DC reject message, receive a second DCR message from the second WTRU. The second DCR message may comprise an indication of a second request for the first WTRU to establish a link with a third WTRU. The executable instructions may configure the at least one processor to send a second DSM command message to the second WTRU. The executable instructions may configure at least one processor to receive a second response message from the second WTRU. The second response message may comprise a DSM complete message, The second response message may comprise an indication of a second MAC address of the second WTRU.

An example first WTRU for performing WTRU to WTRU communications may comprise a transceiver and a processor. The processor may be configured to receive, via the transceiver, a first direct communication request (DCR) message from a second WTRU. The first DCR message may comprise an indication of a request for the first WTRU to establish a link with a third WTRU. The link may be configured to relay traffic between the second WTRU and the third WTRU. The processor may be configured to send, via the transceiver, a second DCR message to the third WTRU. The processor may be configured to receive, via the transceiver, a response message from the third WTRU. The response message may comprise an indication of a medium access control (MAC) address of the third WTRU. The processor may be configured to detect a MAC address conflict associated with the MAC address of the third WTRU. The processor may be configured to send, via the transceiver, a link release (LR) request message to the third WTRU based on detection of the MAC address conflict associated with the MAC address of the third WTRU. The LR request message may comprise a cause code indicative of a conflict with the MAC address of the third WTRU (e.g., cause code indicating that the MAC address of the second WTRU is not unique). The response message may comprise a direct communication accept (DCA) message. The processor may be configured to establish a first secure link with the second WTRU. The processor may be configured to establish a second secure link with the third WTRU. The first secure link may be a PC5 link. The second secure link may be a PC5 link. The LR request message may comprise one or more alternative MAC addresses for the third WTRU. The processor may be configured to receive an LR response message from the third WTRU. The processor may be configured to send a third DCR message to the third WTRU. The processor may be configured to receive a DC accept (DCA) message from the third WTRU, the DCA message may comprise an indication of a MAC address selected from the one or more alternative MAC addresses for the third WTRU.

An example method for performing WTRU to WTRU communications may be performed by a first WTRU. The method may comprise receiving a first direct communication request (DCR) message from a second WTRU. The first DCR message may comprise an indication of a request for the first WTRU to establish a link with a third WTRU. The link may be configured to relay traffic between the second WTRU and the third WTRU. The method may comprise sending a second DCR message to the third WTRU. The method may comprise receiving a response message from the third WTRU. The response message may comprise an indication of a medium access control (MAC) address of the third WTRU. The method may comprise detecting a MAC address conflict associated with the MAC address of the third WTRU. The method may comprise sending a link release (LR) request message to the third WTRU based on detection of the MAC address conflict associated with the MAC address of the third WTRU. The LR request message may comprise a cause code indicative of a conflict with the MAC address of the third WTRU (e.g., cause code indicating that the MAC address of the second WTRU is not unique). The response message may comprise a direct communication accept (DCA) message. The method may comprise establishing a first secure link with the second WTRU. The method may comprise establishing a second secure link with the third WTRU. The first secure link may be a PC5 link. The second secure link may be a PC5 link. The LR request message may comprise one or more alternative MAC addresses for the third WTRU. The method may comprise receiving an LR response message from the third WTRU. The method may comprise sending a third DCR message to the third WTRU. The method may comprise receiving a DC accept (DCA) message from the third WTRU, the DCA message may comprise an indication of a MAC address selected from the one or more alternative MAC addresses for the third WTRU.

At least one example non-transitory computer-readable storage medium may comprise executable instructions for configuring at least one processor to perform WTRU to WTRU communications. The executable instructions may configure at least one processor to receive a first direct communication request (DCR) message from a second WTRU. The first DCR message may comprise an indication of a request for the first WTRU to establish a link with a third WTRU. The link may be configured to relay traffic between the second WTRU and the third WTRU. The executable instructions may configure at least one processor to send a second DCR message to the third WTRU. The executable instructions may configure at least one processor to receive a response message from the third WTRU. The response message may comprise an indication of a medium access control (MAC) address of the third WTRU. The executable instructions may configure at least one processor to detect a MAC address conflict associated with the MAC address of the third WTRU. The executable instructions may configure at least one processor to send a link release (LR) request message to the third WTRU based on detection of the MAC address conflict associated with the MAC address of the third WTRU. The LR request message may comprise a cause code indicative of a conflict with the MAC address of the third WTRU (e.g., cause code indicating that the MAC address of the second WTRU is not unique). The response message may comprise a direct communication accept (DCA) message. The executable instructions may configure at least one processor to establish a first secure link with the second WTRU. The executable instructions may configure at least one processor to establish a second secure link with the third WTRU. The first secure link may be a PC5 link. The second secure link may be a PC5 link. The LR request message may comprise one or more alternative MAC addresses for the third WTRU. The executable instructions may configure at least one processor to receive an LR response message from the third WTRU. The executable instructions may configure at least one processor to send a third DCR message to the third WTRU. The executable instructions may configure at least one processor to receive a DC accept (DCA) message from the third WTRU, the DCA message may comprise an indication of a MAC address selected from the one or more alternative MAC addresses for the third WTRU.

An example first WTRU for performing WTRU to WTRU communications may comprise a transceiver and a processor. The processor may be configured to send, via the transceiver, a direct communication request (DCR) message to a second WTRU. The DCR message may comprise an indication of a request for the first WTRU to establish a link with a third WTRU. The link may be configured to relay traffic between the first WTRU and the third WTRU. The processor may be configured to receive, via the transceiver, a direct security mode (DSM) command message from the second WTRU. The processor may be configured to send, via the transceiver, a response message to the second WTRU. The response message may comprise an indication of a medium access control (MAC) address of the first WTRU. The processor may be configured to receive, via the transceiver, a direct communication (DC) reject message from the second WTRU. The DC reject message may comprise a cause code indicative of a MAC address conflict associated with the MAC address of the first WTRU. The response message may comprise a DSM complete message. The DSM command message may be configured to establish a secure link between the first WTRU and the second WTRU. The MAC address conflict associated with the MAC address of the first WTRU may correspond to the MAC address of the first WTRU being used by another WTRU associated with the second WTRU. The processor may be configured to, subsequent to receiving the DC reject message, send a second DCR message to the second WTRU, wherein the second DCR message may comprise an indication of a second request for the first WTRU to establish a link with the third WTRU. The processor may be configured to receive a second DSM command message from the second WTRU. The processor may be configured to send a second response message to the second WTRU, wherein the second response message may comprise a DSM complete message, and wherein the second response message may comprise an indication of a second medium access control (MAC) address of the first WTRU.

An example method for performing WTRU to WTRU communications may be performed by a first WTRU. The method may comprise sending a direct communication request (DCR) message to a second WTRU. The DCR message may comprise an indication of a request for the first WTRU to establish a link with a third WTRU. The link may be configured to relay traffic between the first WTRU and the third WTRU. The method may comprise receiving a direct security mode (DSM) command message from the second WTRU. The method may comprise sending a response message to the second WTRU. The response message may comprise an indication of a medium access control (MAC) address of the first WTRU. The method may comprise receiving a direct communication (DC) reject message from the second WTRU. The DC reject message may comprise a cause code indicative of a MAC address conflict associated with the MAC address of the first WTRU. The response message may comprise a DSM complete message. The DSM command message may be configured to establish a secure link between the first WTRU and the second WTRU. The MAC address conflict associated with the MAC address of the first WTRU may correspond to the MAC address of the first WTRU being used by another WTRU associated with the second WTRU. The method may comprise, subsequent to receiving the DC reject message, sending a second DCR message to the second WTRU, wherein the second DCR message may comprise an indication of a second request for the first WTRU to establish a link with the third WTRU. The method may comprise receiving a second DSM command message from the second WTRU. The method may comprise sending a second response message to the second WTRU, wherein the second response message may comprise a DSM complete message, and wherein the second response message may comprise an indication of a second medium access control (MAC) address of the first WTRU.

At least one example non-transitory computer-readable storage medium may comprise executable instructions for configuring at least one processor to perform WTRU to WTRU communications. The executable instructions may configure at least one processor to send a direct communication request (DCR) message to a second WTRU. The DCR message may comprise an indication of a request for the first WTRU to establish a link with a third WTRU. The link may be configured to relay traffic between the first WTRU and the third WTRU. The executable instructions may configure at least one processor to receive a direct security mode (DSM) command message from the second WTRU. The executable instructions may configure at least one processor to send a response message to the second WTRU. The response message may comprise an indication of a medium access control (MAC) address of the first WTRU. The executable instructions may configure at least one processor to receive a direct communication (DC) reject message from the second WTRU. The DC reject message may comprise a cause code indicative of a MAC address conflict associated with the MAC address of the first WTRU. The response message may comprise a DSM complete message. The DSM command message may be configured to establish a secure link between the first WTRU and the second WTRU. The MAC address conflict associated with the MAC address of the first WTRU may correspond to the MAC address of the first WTRU being used by another WTRU associated with the second WTRU. The executable instructions may configure at least one processor to, subsequent to receiving the DC reject message, send a second DCR message to the second WTRU, wherein the second DCR message may comprise an indication of a second request for the first WTRU to establish a link with the third WTRU. The executable instructions may configure at least one processor to receive a second DSM command message from the second WTRU. The executable instructions may configure at least one processor to send a second response message to the second WTRU, wherein the second response message may comprise a DSM complete message, and wherein the second response message may comprise an indication of a second medium access control (MAC) address of the first WTRU.

An example first WTRU for performing WTRU to WTRU communications may comprise a transceiver and a processor. The processor may be configured to receive, via the transceiver, a direct communication request (DCR) message from a second WTRU. The processor may be configured to send, via the transceiver, a response message to the second WTRU. The response message may comprise an indication of a medium access control (MAC) address of the first WTRU. The processor may be configured to receive, via the transceiver, a link release (LR) request message from the second WTRU. The LR request message may comprise a cause code indicative of a MAC address conflict associated with the MAC address of the first WTRU. The DCR message may comprise an indication of a request for the first WTRU to establish communications with a third WTRU. The MAC address conflict associated with the MAC address of the first WTRU may comprise a conflict with the MAC address of the first WTRU and another WTRU associated with the second WTRU. The response message may comprise a direct communication accept (DCA) message. The processor may be configured to establish a PC5 secure link with the second WTRU. The LR request message comprises one or more alternative MAC addresses for the first WTRU. The processor may be configured to send, to the second WTRU, an LR response message. The processor may be configured to send a DC accept (DCA) message to the second WTRU. The DCA message may comprise an indication of a MAC address selected from the one or more alternative MAC addresses for the first WTRU.

An example method for performing WTRU to WTRU communications may be performed by a first WTRU. The method may comprise receiving a direct communication request (DCR) message from a second WTRU. The method may comprise sending a response message to the second WTRU. The response message may comprise an indication of a medium access control (MAC) address of the first WTRU. The method may comprise receiving a link release (LR) request message from the second WTRU. The LR request message may comprise a cause code indicative of a MAC address conflict associated with the MAC address of the first WTRU. The DCR message may comprise an indication of a request for the first WTRU to establish communications with a third WTRU. The MAC address conflict associated with the MAC address of the first WTRU may comprise a conflict with the MAC address of the first WTRU and another WTRU associated with the second WTRU. The response message may comprise a direct communication accept (DCA) message. The method may comprise establishing a PC5 secure link with the second WTRU. The LR request message comprises one or more alternative MAC addresses for the first WTRU. The method may comprise sending, to the second WTRU, an LR response message. The method may comprise sending a DC accept (DCA) message to the second WTRU. The DCA message may comprise an indication of a MAC address selected from the one or more alternative MAC addresses for the first WTRU.

At least one example non-transitory computer-readable storage medium may comprise executable instructions for configuring at least one processor to perform WTRU to WTRU communications. The executable instructions may configure at least one processor to receive a direct communication request (DCR) message from a second WTRU. The executable instructions may configure the at least one processor to send a response message to the second WTRU. The response message may comprise an indication of a medium access control (MAC) address of the first WTRU. The executable instructions may configure the at least one processor to receive a link release (LR) request message from the second WTRU. The LR request message may comprise a cause code indicative of a MAC address conflict associated with the MAC address of the first WTRU. The DCR message may comprise an indication of a request for the first WTRU to establish communications with a third WTRU. The MAC address conflict associated with the MAC address of the first WTRU may comprise a conflict with the MAC address of the first WTRU and another WTRU associated with the second WTRU. The response message may comprise a direct communication accept (DCA) message. The executable instructions may configure the at least one processor to establish a PC5 secure link with the second WTRU. The LR request message comprises one or more alternative MAC addresses for the first WTRU. The executable instructions may configure the at least one processor to send, to the second WTRU, an LR response message. The executable instructions may configure the at least one processor to send a DC accept (DCA) message to the second WTRU. The DCA message may comprise an indication of a MAC address selected from the one or more alternative MAC addresses for the first WTRU.

BRIEF DESCRIPTION OF THE DRAWINGS

A more detailed understanding may be had from the detailed description below, given by way of example in conjunction with drawings appended hereto. Figures in such drawings, like the detailed description, are examples. As such, the Figures and the detailed description are not to be considered limiting, and other equally effective examples are possible and likely. Like reference numerals ("ref" or "refs.") in the Figures indicate like elements.

EXAMPLE NETWORKS FOR IMPLEMENTATION OF THE INVENTION

Figure 1A:
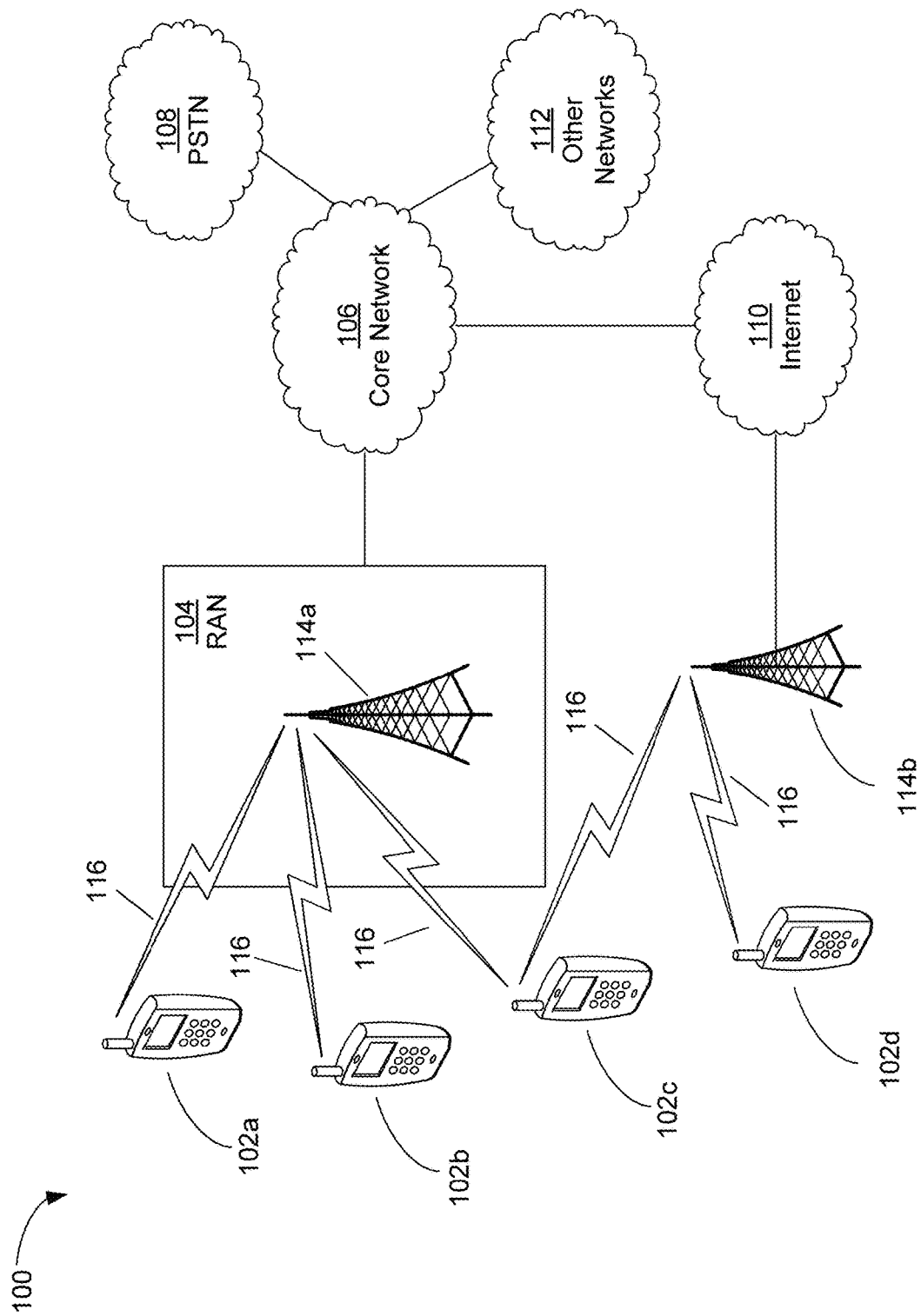
FIG. 1A is an example system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE. Further, any description herein that is described with reference to a UE may be equally applicable to a WTRU (or vice versa). For example, a WTRU may be configured to perform any of the processes or procedures described herein as being performed by a UE (or vice versa).

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a next generation Node B (gNB), a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
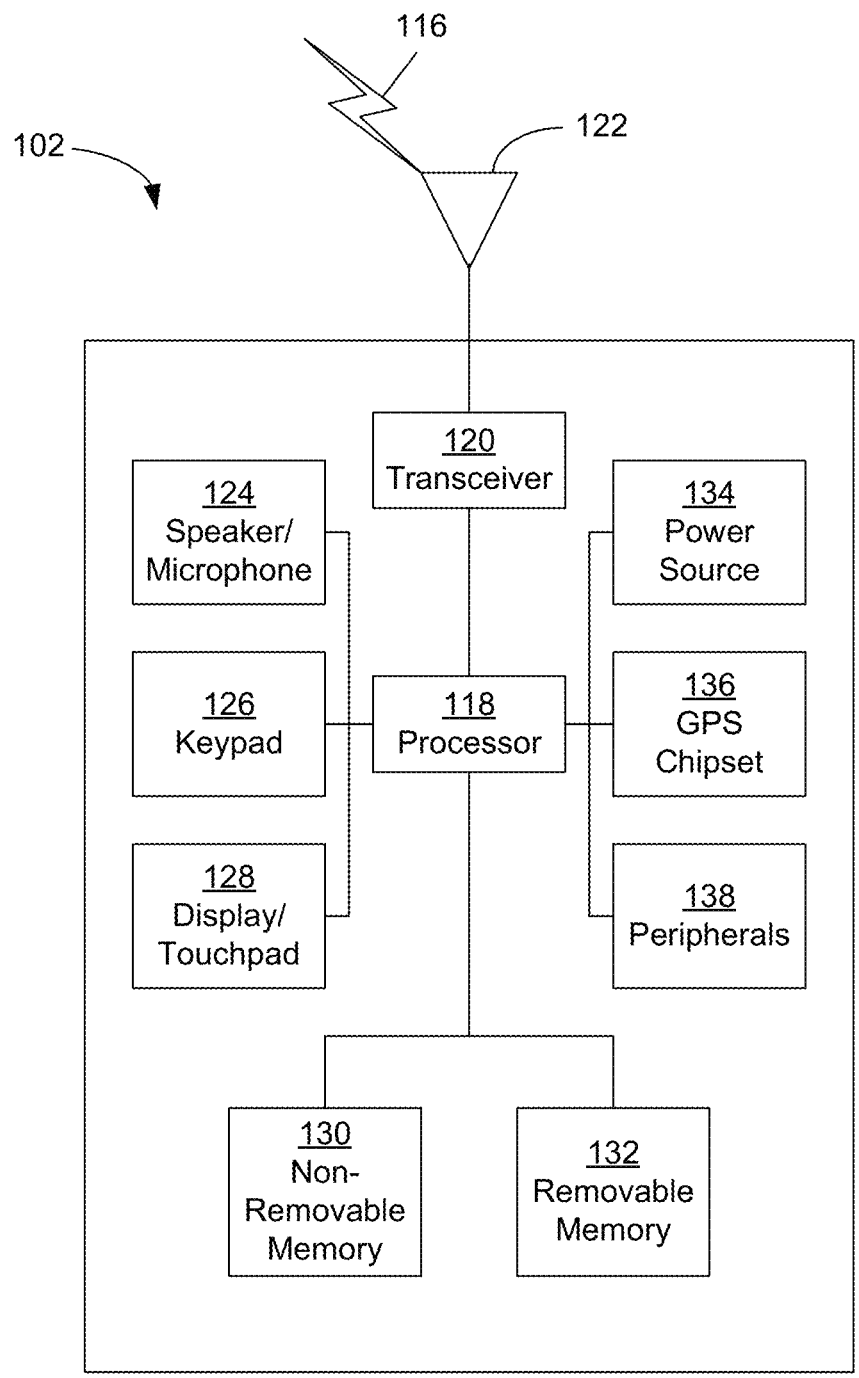
FIG. 1B is an example system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception)).

Figure 1C:
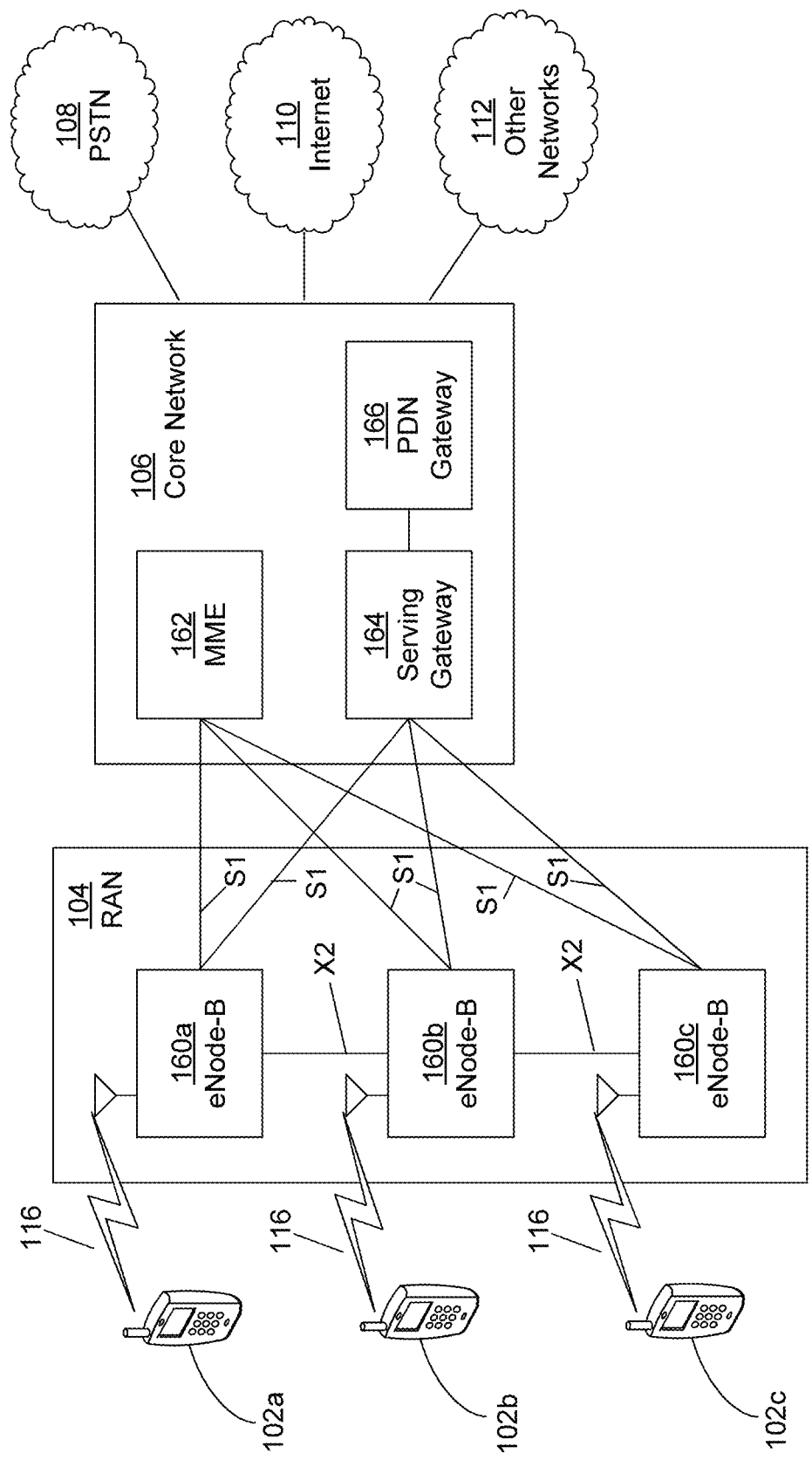
FIG. 1C is an example system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
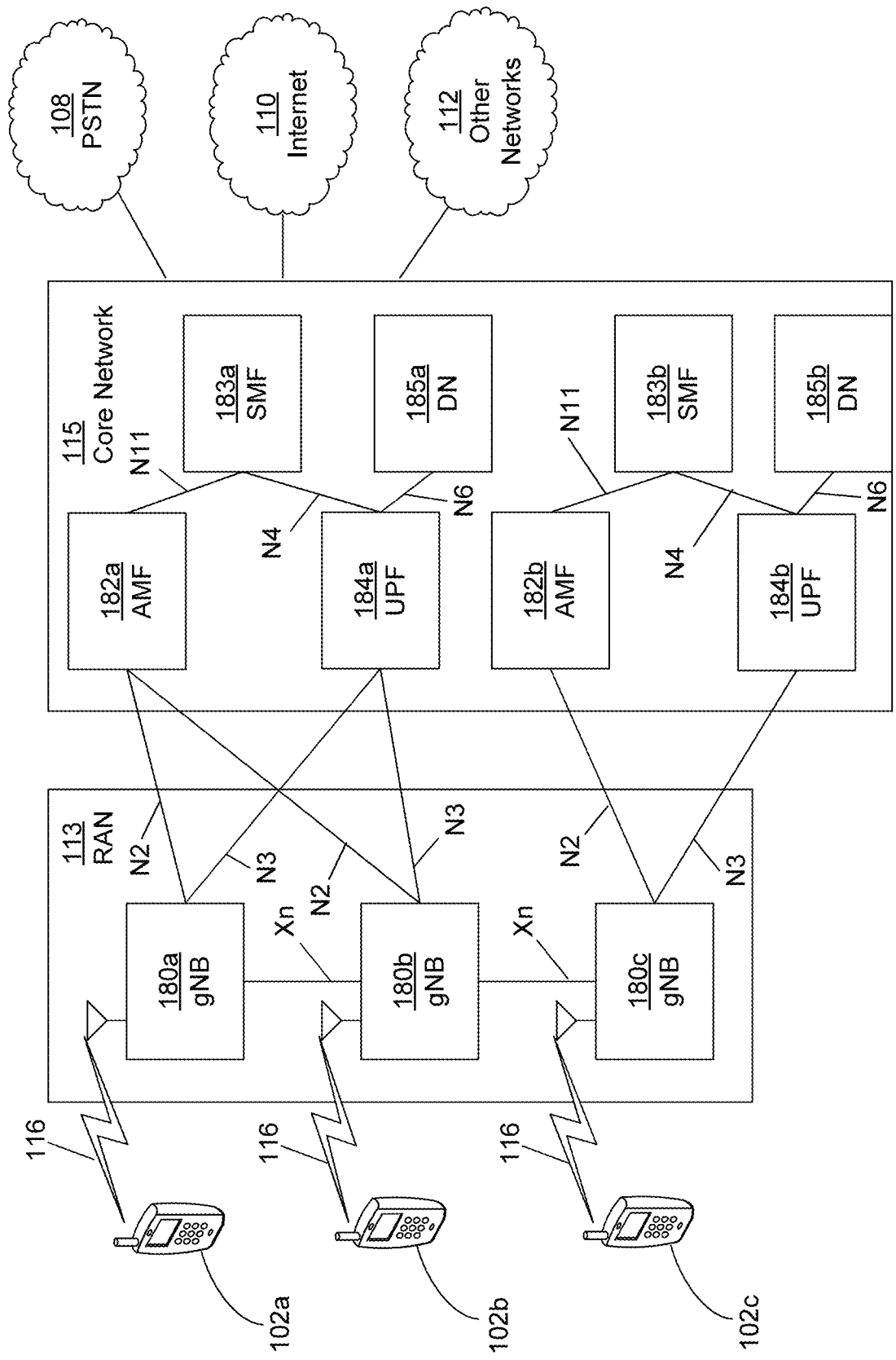
FIG. 1D is an example system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 180b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP (third generation partnership project) access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-ID, and the corresponding description of FIGS. 1A-ID, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may perform testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Figure 2:
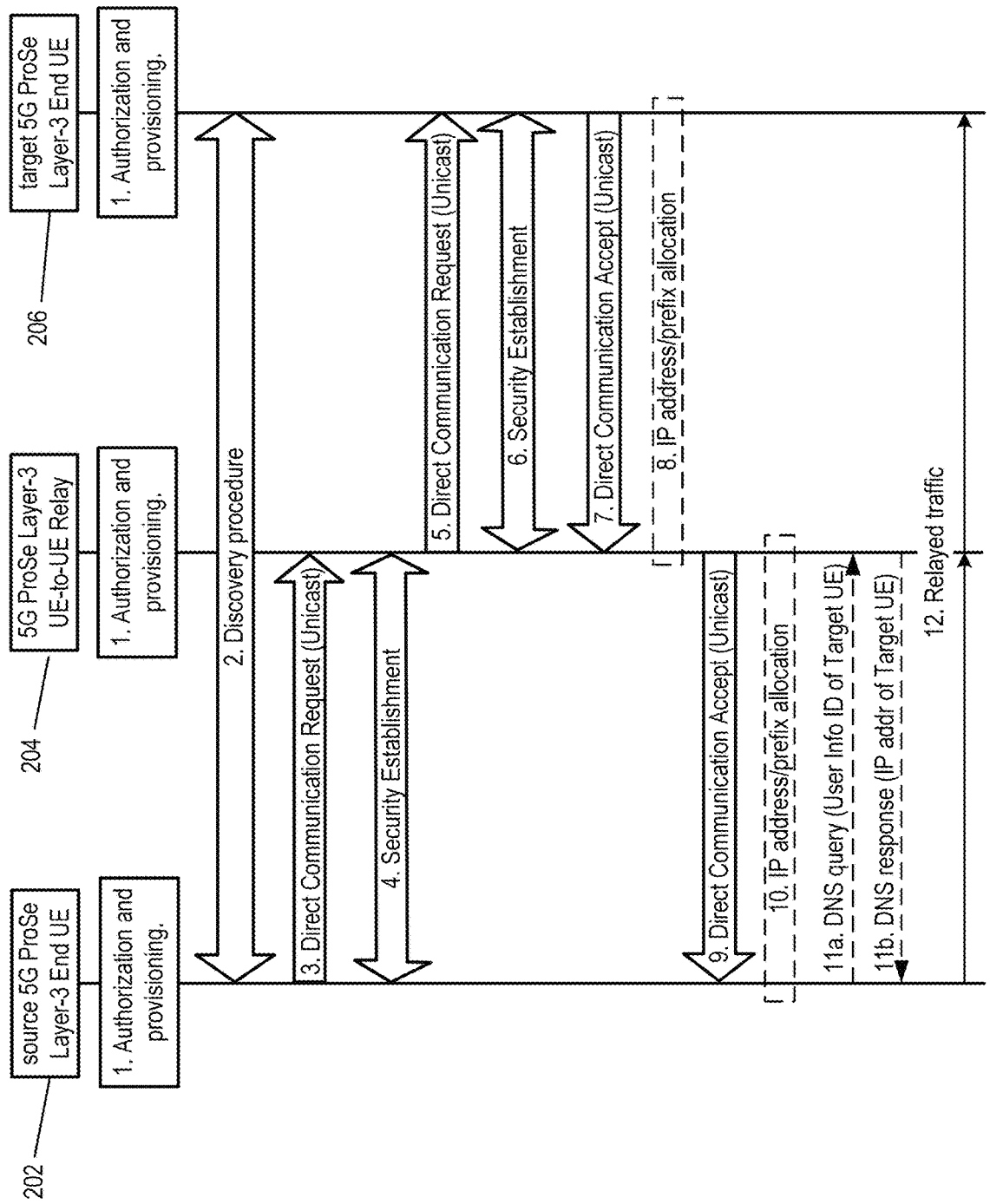
FIG. 2 is a diagram depicting example fifth generation (5G) ProSe (proximity-based services or proximity services) communications via a 5G ProSe Layer-3 UE-to-UE Relay.

Described herein are methods and apparatuses for handling U2U (also referred to as UE-to-UE or WTRU-to-WTRU) MAC address conflicts. U2U communications may be established via PC5 links. FIG. 2 is a diagram depicting example 5G ProSe communications via a 5G ProSe Layer-3 UE-to-UE Relay. More specifically, FIG. 2 depicts an example PC5 unicast link establishment procedure between a source end UE and a target end UE via a Layer-3 UE-to-UE Relay. If the PC5 link is used for transferring traffic, such as Ethernet traffic for example, the source end WTRU (202) may send its MAC address to the WTRU-to-WTRU Relay (204) after security protection is enabled, as depicted at step 4 of FIG. 2, using, for example, a direct security model (DSM) Complete message. If the MAC address is being used by another end WTRU, then the WTRU-to-WTRU Relay (204) may send a message to the source end WTRU (202) indicating there is a MAC address conflict. After the Security Establishment procedure (step 4) between the source end WTRU (202) and the WTRU-to-WTRU Relay (204) is completed, the WTRU-to-WTRU Relay (204) may send a Direct Communication Request message to initiate the unicast Layer-2 link establishment procedure (Step 5). The target end WTRU (206) may respond by establishing security with the WTRU-to-WTRU Relay (Step 6). The WTRU-to-WTRU Relay (204) may send the MAC address of the source end WTRU (202) to the target end WTRU (206) after the security protection is enabled, as depicted at step 6 using a DSM Complete message, for example. The target end WTRU (206) may send a Direct Communication Accept (DCA) message to the WTRU-to-WTRU Relay (204) with which security has successfully been established (step 7). The target end WTRU (206) may include its MAC address on the DCA message at step 7. After receiving the Direct Communication Accept message from the target end WTRU (206), the WTRU-to-WTRU Relay (204) may send a Direct Communication Accept message to the source end WTRU (202) with which security has successfully been established (Step 9). The Relay (204) may include the target end WTRU MAC address on the DCA message at step 9. For Ethernet communication, the WTRU-to-WTRU Relay (204) may maintain the association between PC5 links and Ethernet MAC addresses received from the source and target end WTRUs.

Internet privacy is becoming a huge concern as more and more mobile devices are getting directly (e.g., via cellular or Wi-Fi) or indirectly (e.g., via a smartphone using Bluetooth) connected to the Internet. An aspect for consideration for location tracking is the wide use of long-lasting identifiers, such as MAC addresses. A MAC address may comprise a 48 bit value composed of a 24 bit Organizationally Unique Identifier (OUI) portion and a 24 bit Network Interface Controller (NIC) portion. MAC randomization may be used to address privacy. MAC addressing may include one bit to specify if the hardware address is locally or globally administered. This may allow generating local addresses without the need for a global coordination mechanism to ensure that the generated address is still unique within the local network. This feature may be used to generate random addresses, which decouple the globally-unique identifier from the device and therefore make it more difficult to track a user device from its MAC/L2 (layer 2) address.

A PC5 link may be established between a source end WTRU and a target end WTRU via a WTRU-to-WTRU Relay, even if the MAC address of the source end WTRU is not unique. The WTRU-to-WTRU Relay may send a message to the source end WTRU indicating there is a MAC address conflict. The message to the source end WTRU may not be mandatory and the source end WTRU's behavior may not be defined. Moreover, the PC5 link may be allowed to be established even when an MAC address conflict is detected. Upon receiving traffic, such as Ethernet traffic for example, with a non-unique destination MAC address, the Relay may not be able to determine to which PC5 link the traffic should be forwarded, the Relay may decide to forward the traffic to the wrong source WTRU, the Relay may drop the traffic with non-unique MAC address, or any appropriate combination thereof. Furthermore, existing procedures do not consider 2nd PC5 hops, between a Relay and a target WTRU, where security procedures may be triggered by the target end WTRU.

In the case of WTRU-to-Network Relay, MAC address collision avoidance among Remote WTRUs may be supported, at least to ensure that the Relay reports unique MAC address for each connected Remote WTRU to the network Session Management Function (SMF) as the MAC address may be used to uniquely identify the Remote WTRU externally to the 5G core network (5GC). Furthermore, the WTRU-to-Network Relay may use individual internet protocol (IP) tunnels over the user-to-user (Uu) link to transport traffic to and from each Remote WTRU. If internally the WTRU-to-Network Relay uses a destination Remote WTRU MAC address to find which PC5 link to route downlink traffic to, then it may be advantageous for the Relay to ensure the uniqueness of Remote WTRU MAC addresses at the Relay (as in the case of WTRU-to-WTRU Relay). Accordingly, described herein are apparatuses and methods addressing how a Relay may ensure uniqueness of source end WTRUs' MAC addresses and how a Relay may ensure uniqueness of target end WTRUs' MAC addresses.

Additionally, in scenarios where a WTRU is connected over multiple ProSe links to other WTRUs, MAC address conflicts may occur across the ProSe links. For example, a source WTRU may be connected to a target WTRU A through ProSe link A, and the same source WTRU may be connected a second target UE B through a second ProSe link B. If target WTRU A and target WTRU B share the same MAC address, then the source WTRU may not know which ProSe link to choose when transmitting data. This scenario also may apply in the case where a source (or target) end WTRU communicates with multiple target (or source) end WTRUs via multiple WTRU-to-WTRU Relays. For example, if a source end WTRU communicates with target end WTRU1 via Relay1 and with target end WTRU2 via Relay2, and if both target end WTRUs use the same MAC address then the Relays may not detect the MAC address conflict and thus may not be able to handle it. For this reason, MAC address conflict resolution may occur at the end WTRU. Additionally described herein are apparatuses and methods for addressing how an end WTRU may ensure uniqueness of MAC address among its peer end WTRUs.

As described herein the following terms may be used interchangeably: Relay, UE-to-UE Relay, UE-to-UE Relay 5G Prose Layer-3, WTRU-to-WTRU Relay, and WTRU-to-WTRU Relay 5G Prose Layer-3. Also, the terms UE, 5G Prose end UE, WTRU, and 5G ProSe WTRU may be used interchangeably.

Herein described examples are based on end WTRUs possessing the capability to change their MAC addresses. The end WTRUs MAC address may be administered by the end WTRUs or by the Relay. For example, the end WTRUs may generate a new MAC address or may be allocated a new MAC address by the Relay when needed, over the PC5 interface.

Moreover, in scenarios in which the end WTRU checks/validates the uniqueness of MAC addresses among its peer UEs, as described herein, the same procedures may be used by replacing the procedures of the Relay with the corresponding end WTRU. As described herein, the end WTRU's MAC address may be changed to address privacy aspects. The herein described examples of mitigating MAC address conflict detection and/or prevention at a WTRU-to-WTRU Relay may be applied to a WTRU-to-Network relay.

Example detection of non-unique MAC addresses may be accomplished by, but not limited to, comparing a new MAC address with other existing MAC addresses stored in a local database (e.g., address resolution protocol (ARP) table). Non-unique MAC addresses may be detected by any appropriate entity, such as, for example, a Relay, a WTRU, a node, or any appropriate combination thereof. A look-up request may be sent to a node in the network (e.g., a relay WTRU) with the MAC address in question. In response, the sender may receive an indication of whether the MAC address in the request is unique or not. Alternatively, the response may contain all MAC addresses known to the node, which in-turn may be used for comparing with the MAC address in question. Some relays may store MAC addresses of all other WTRUs and provide MAC addresses look-up services to other WTRUs. An ARP may be used for discovering the MAC address. Other WTRUs may be requested (e.g., via a broadcast message), to check if they hold the MAC address in question, to obtain their MAC addresses for comparing.

Example allocation of non-unique MAC address may be accomplished by, but not limited to, maintaining a list of previously allocated MAC addresses with their assigned nodes and allocating the same MAC address to the same node. A MAC address may be randomly generated and checked if the generated address is unique using any of procedures described above. Allocation of non-unique MAC addresses may be accomplished by any appropriate entity or apparatus, such as, for example, a Relay.

Figure 3:
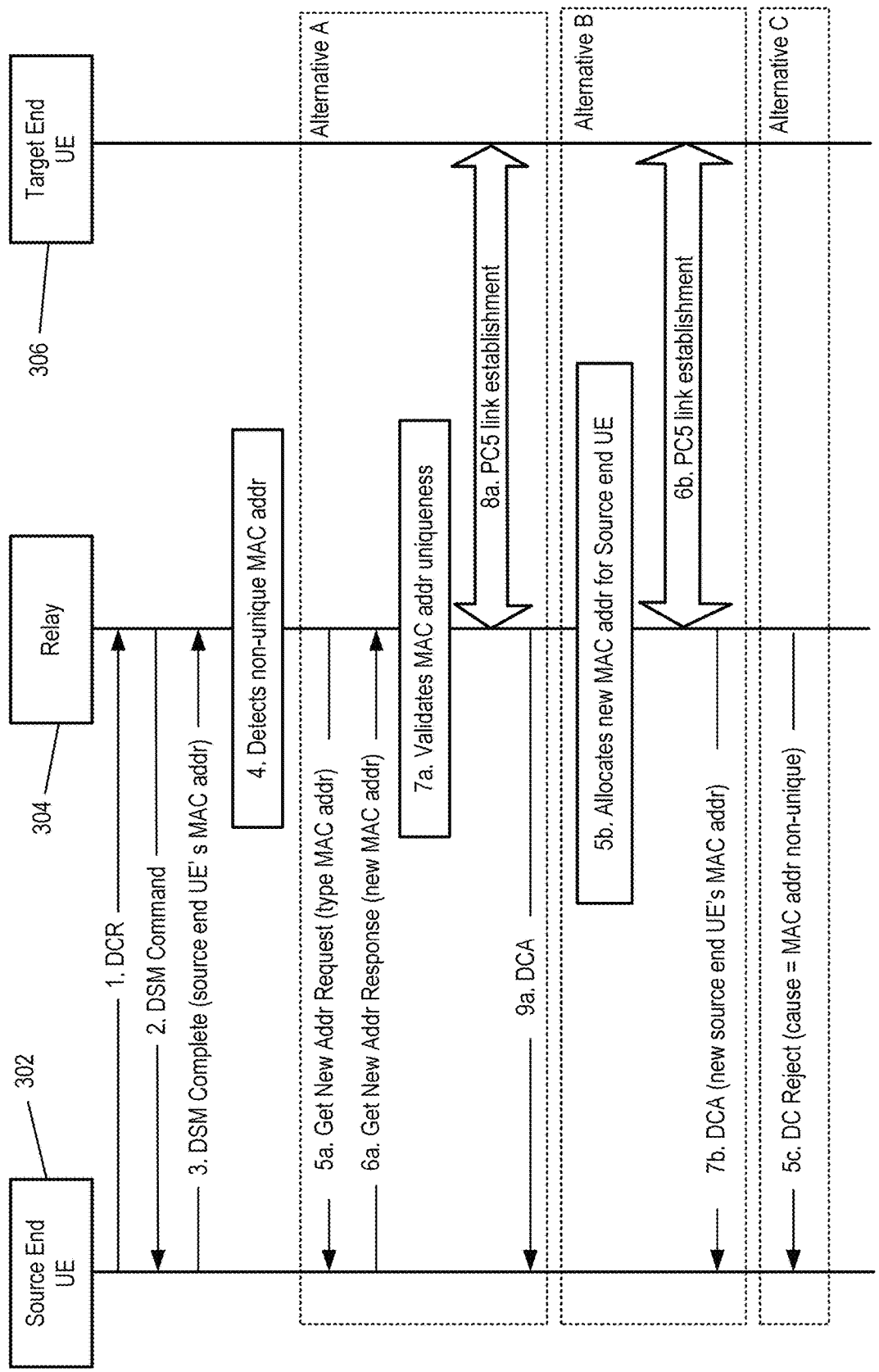
FIG. 3 depicts an example process in which a Relay detects a source end WTRU's MAC address is conflicting with another MAC address.

FIG. 3 depicts an example process in which a Relay detects a source end WTRU's MAC address is conflicting with another MAC address. At step 1, Relay WTRU (304) may receive a direct communication request (DCR) message from source end WTRU (302), wherein the DCR message may comprise an indication of a request for the source end WTRU (302) to establish a link with the target end WTRU (306). The link may be configured to relay traffic between the source end WTRU (302) and the target end WTRU (306). The Relay (304) may detect that a source end WTRU's (302) MAC address conflicts with another MAC address. The source end WTRU (302) may send a Direct Communication Request (DCR) message to WTRU-to-WTRU Relay (304), initiating link establishment procedures (Step 1). The relay WTRU (304) may send a DSM command message to source end WTRU (302). The WTRU-to-WTRU Relay (304) may send a DSM Command message to the source end WTRU (302) to establish security (Step 2). The Relay WTRU (304) may receive a response message from the source end WTRU (302) (step 3). The response message may comprise an indication of a MAC address associated with the source end WTRU (302). The response message may comprise a DSM complete message. A WTRU may be associated with another WTRU in any appropriate manner. For example, a WTRU may have in memory, a MAC address of another WTRU, and thus the WTRUs may be associated. A WTRU does not necessarily have to be connected to another WTRU to be associated with the other WTRU. The source end WTRU (302) may send a DSM Complete message including its source WTRU's MAC address (Step 3). The relay (304) may detect a MAC address conflict associated with the MAC address of the source end WTRU (302). The MAC address conflict may be associated with the MAC address of the source end WTRU (302) being used by another WTRU associated with the relay WTRU (304). The Relay (304) may detect that the MAC address received from the source WTRU (302) is not unique, for example, if there is a conflict with the MAC address of another end WTRU (Step 4). Detection may be performed as described above.

Depicted as Alternative A, following Step 4, the Relay (304) may send a PC5 signaling protocol stack (PC5-S) Request message to the source end WTRU (302) requesting a new MAC address (Alternative A, Step 5a). This may be a new message, such as, for example, Get New Address Request, with "MAC address type" specified, or a modified existing message, such as, for example, DSM Command or Link Modification Request, with "new MAC address needed" specified. The source end WTRU (302) may reply with a PC5-S Response message including a new source WTRU's MAC address (Alternative A, Step 6a). This may be a new message, such as, for example, Get New Address Response or a modified existing message, such as, for example, DSM Complete or Link Modification Response. The Relay (304) may check if the MAC address received from the source WTRU (302) is unique (Step 7a). This may be performed as described above. The Relay (304) may establish a PC5 link with the target end WTRU (306) (Step 8a). The Relay (304) may send a DCA message to the source end WTRU (302) indicating that the DCR is accepted (Alternative A, Step 9a).

Depicted as Alternative B, following Step 4, the Relay (304) may allocate a new MAC address for the source end WTRU (302) (Alternative B, Step 5b). This may be performed based as described above. The Relay (304) may establish a PC5 link with the target end WTRU (306) (Alternative B, Step 6b). The Relay (304) may send a DCA message to the source end WTRU (302) including the source end WTRU's new allocated MAC address (Alternative B, Step 7b).

Depicted as Alternative C, following Step 4, if the Relay (304) detects that the MAC address of the source end WTRU (302) is not unique, the Relay (304) may send a direct communication (DC) Reject message to the source end WTRU (302) comprising an indication that the MAC address is not unique (e.g., cause=MAC address not unique) (Alternative C, Step 5c). The source end WTRU (302) may generate a new MAC address and re-initiate the PC5 link establishment procedure with the Relay (Step 1).

Subsequent to sending the DC reject message, the Relay WTRU (304) may receive a second DCR message from the source end WTRU (302) (similar to step 1), wherein the second DCR message may comprise an indication of a second request for the source end WTRU (302) to establish a link with the target end WTRU (306). The process may continue as depicted in steps 2, 3, and 4, based upon the second DCR message. The Relay WTRU (304) may send a second DSM command message (similar to step 2), the Relay WTRU (304) may receive a second response message, wherein the second response message may comprise an indication of a second medium access control (MAC) address of the second WTRU.

Figure 4:
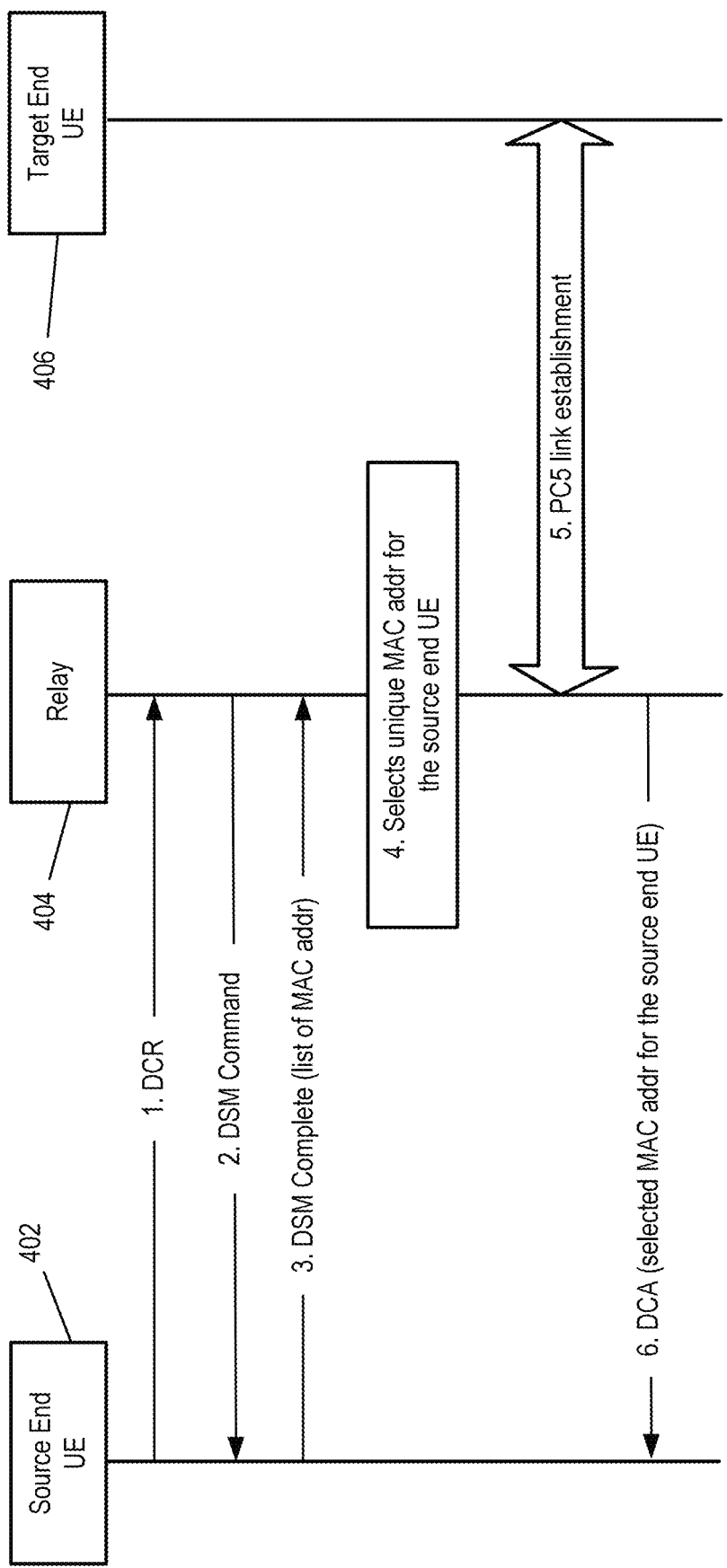
FIG. 4 depicts an example process of a Relay selecting a source end WTRU's MAC address.

FIG. 4 is an example depiction of a Relay selecting a source end WTRU's MAC address. A source end WTRU may provide a list of MAC addresses. The source WTRU (402) may send a Direct Communication Request message to WTRU-to-WTRU Relay (404), initiating link establishment procedures (Step 1). The WTRU-to-WTRU Relay (404) may send a DSM Command message to the source end WTRU (402) to establish security with the source end WTRU (402) (Step 2). The source end WTRU (402) may send a DSM Complete message to WTRU-to-WTRU Relay (404), wherein the DSM Complete message may include source WTRU's MAC address or one or more MAC addresses that source WTRU (402) can use for the link between the source WTRU (402) and the relay (404) (Step 3). For example, this may be specified as a list or a range. The Relay (402) may select a unique MAC address from the list received from the source WTRU (402) (Step 4). This may be performed based on procedures as described above. The Relay (404) may establish a PC5 link with the target end WTRU (406) (Step 5). The Relay (404) may send a DC Accept message to the source end WTRU (402) including the selected MAC address to be used by the source end WTRU (402) (Step 6).

Figure 5:
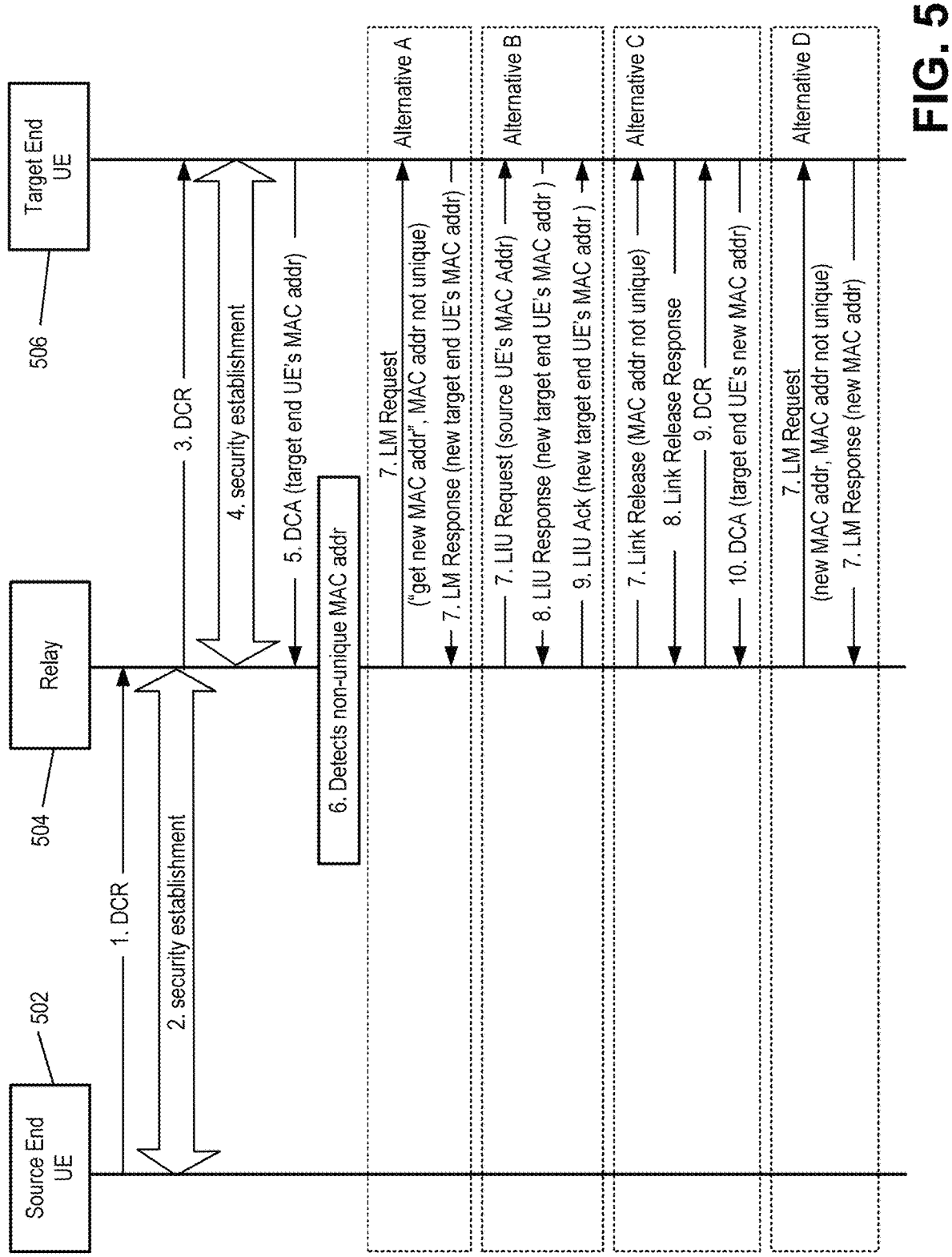
FIG. 5 depicts an example process of a Relay detecting that a target end WTRU's MAC address is conflicting with another MAC address.

FIG. 5 is an example depiction of a Relay detecting that a target end WTRU's MAC address conflicts with another MAC address. At step 1, Relay (504) may receive a direct communication request (DCR) message from source end WTRU (502), wherein the DCR message may comprise an indication of a request for the source end WTRU (502) to establish a link with the target end WTRU (506). The link may be configured to relay traffic between the source end WTRU (502) and the target end WTRU (506). The source WTRU (502) may send a Direct Communication Request message to WTRU-to-WTRU Relay (504), initiating link establishment procedures (Step 1). The Relay WTRU (504) may establish a secure link with the source end WTRU (502) (step 2). The WTRU-to-WTRU Relay (504) and the source end WTRU (502) may establish the security for the PC5 link (Step 2). The Relay (504) may send a Direct Communication Request to the target end WTRU (506) for traffic (Step 3). The Relay (504) may send a DCR message to the target end WTRU (506), wherein the DCR message may comprise an indication of a request for the target end WTRU (506) to establish communications (e.g., a link) with the source end WTRU (502) (step 3). The Relay WTRU (504) may establish a secure link with the target end WTRU (506) (step 4). The Relay (504) and the target end WTRU (506) may establish the security for the PC5 link (Step 4). The Relay WTRU (504) may receive a response message from the target end WTRU (506) (step 5). The response message may comprise an indication of a MAC address associated with the target end WTRU (506). The response message may comprise a DCA message. A WTRU may be associated with another WTRU in any appropriate manner. For example, a WTRU may have in memory, a MAC address of another WTRU, and thus the WTRUs may be associated. A WTRU does not necessarily have to be connected to another WTRU to be associated with the other WTRU. The Relay (504) may receive a Direct Communication Accept (DCA) message from Relay (506), wherein the DCA message may include the target WTRU's MAC address (Step 5). The Relay (504) may detect a MAC address conflict associated with the MAC address of the target end WTRU (step 6). The Relay (504) may detect that the MAC address received from the target WTRU (506) is not unique, for example, that there is a conflict with the MAC address of another end WTRU (Step 6). This may be performed based on procedures described above.

Depicted as Alternative A, following Step 6, the Relay (504) may block traffic from/to this PC5 link and may send a Link Modification (LM) Request message to the target end WTRU (506), for example with an operation code="get new MAC address" and cause="MAC address not unique" (Alternative A, Step 7). The target end WTRU (506) may send a Link Modification (LM) Response to the Relay (504), wherein the LM Response may include a new MAC address (Alternative A, Step 7).

Depicted as Alternative B, following Step 6, the Relay (504) may interpret the reception of a non-unique MAC address as a trigger for the link identifier update (LIU) procedure. The Relay (504) may send a Link Identifier Update Request message to the target end WTRU (506) (Alternative B, Step 7). This message may include suggested/alternative MAC addresses for the Target end WTRU (506) and may include the source end WTRU's MAC address as received at step 2. The target end WTRU (506) may send a LIU Response to the Relay (504), wherein the LIU Response may include a new target end WTRU's MAC address (Alternative B, Step 8). The new MAC address may be selected from the list of suggested/alternative MAC address (if received at step 7). The Relay (504) may send a LIU Ack message to the Target end WTRU (506), wherein the LIU Ack message may include the new target end WTRU's MAC address as received at step 8 (Alternative B, Step 9).

Depicted as Alternative C, following Step 6, the Relay (504) may send a Link Release Request message to target end WTRU (506), for example, cause="MAC address not unique" (Alternative C, Step 7). The Relay (504) may send the link release (LR) request message to the target end WTRU (506) based on detection of the MAC address conflict associated with the MAC address of the target end WTRU (506). The LR request message may comprise one or more alternative MAC addresses for the target end WTRU (506). The LR request message may comprise an indication of a cause code indicating a conflict associated with the MAC address of the target end WTRU (506) (e.g., MAC address not unique). This LR message may include suggested/alternative MAC addresses for the Target end WTRU (506). The target end WTRU (506) may keep track of the suggested MAC addresses from the Relay (504) to be used during a subsequent PC5 link establishment procedure. The target end WTRU (506) may send a Link Release Response message to the Relay (504) (Alternative C, Step 8). The Relay (504) may send another Direct Communication Request to the target end WTRU (506) for traffic (Alternative C, Step 9). The target end WTRU (506) may verify if any suggested MAC addresses from that Relay have previously been received. The target end WTRU (506) may select a MAC address from the list received at Alternate C, step 7. The target end WTRU (506) may continue the PC5 link establishment. After successful security establishment, the target end WTRU (506) may send a DCA message to the Relay (504), wherein the DCA message may include the selected MAC address (Alternative C, Step 10).

Depicted as Alternative D, following Step 6, the Relay (504) may block traffic from/to this PC5 link and may send a Link Modification Request message to target end WTRU (506) including a new MAC address for the Target end WTRU (506) (Alternative D, Step 7). Alternatively, a list of MAC address may be specified. The target end WTRU (506) may send a Link Modification Response to the Relay (504) wherein the Linked Modification Response may acknowledge the reception of the new MAC address assigned by the Relay (504) (Alternative D, Step 7).

Alternatively, target end WTRU (506) may select a new MAC address from the list received from the Relay (504) and may provide its selected MAC address with the Link Modification Response.

Figure 6:
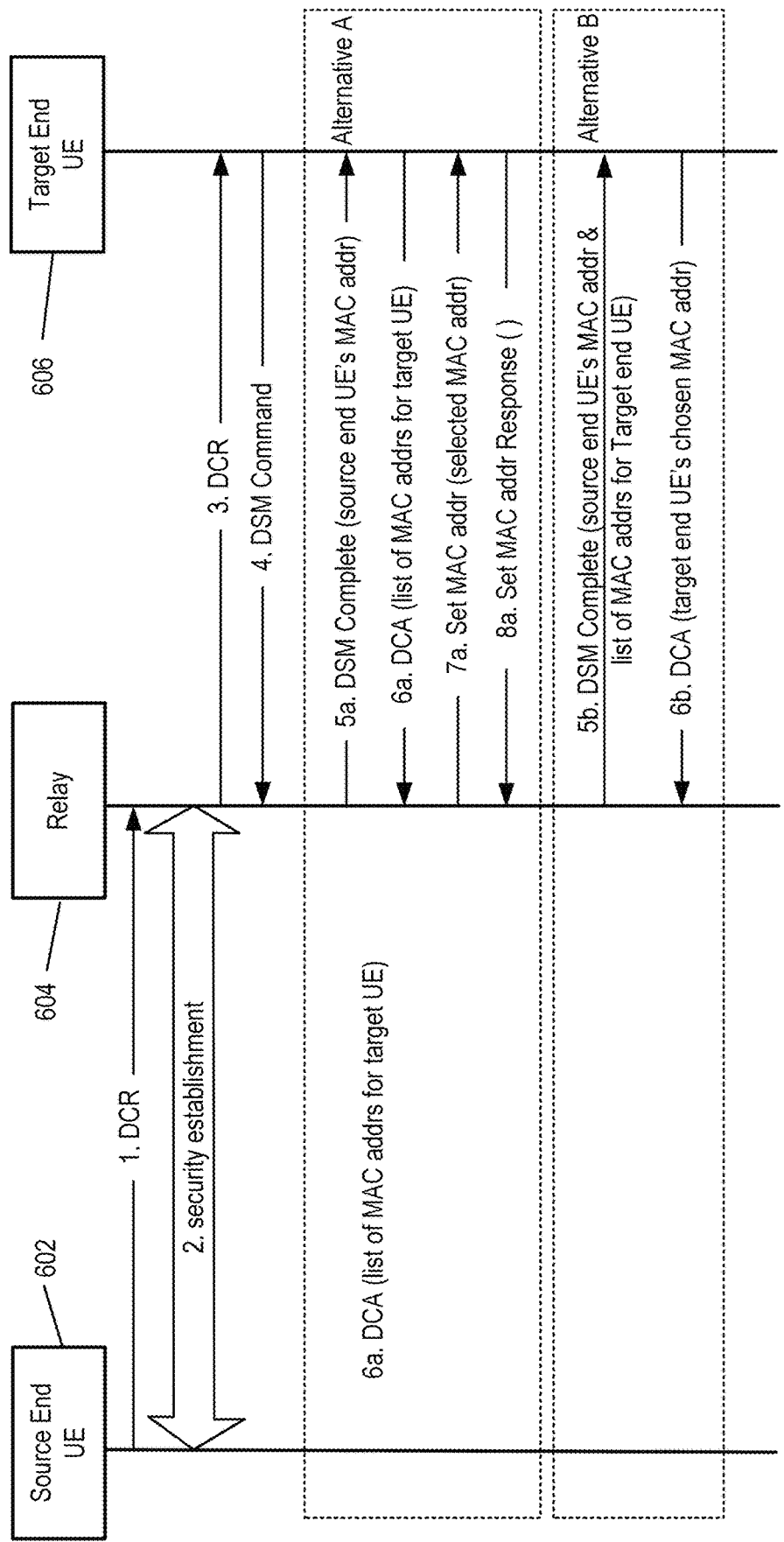
FIG. 6 depicts an example process for a target end WTRU or a Relay providing a list of MAC addresses.

FIG. 6 depicts an example process for a target end WTRU or a Relay providing a list of MAC addresses. FIG. 6 is an example depiction of a target end WTRU or a Relay providing a list of MAC addresses. The Relay (604) may receive a DCR message from the source end WTRU (602), for traffic and may establish security (Step 1). The WTRU-to-WTRU Relay (604) and the source end WTRU (602) may establish the security for the PC5 link (Step 2). The Relay (604) may send a DCR to the target end WTRU (606), for traffic (Step 3). The Relay (604) may receive a DSM Command message from the target end WTRU (606) (Step 4).

Depicted as Alternative A, following Step 4, the target end WTRU (606) may provide a list of MAC addresses. The Relay (604) may send a DSM Complete message including source end WTRU MAC address (Alternative A, Step 5a). The target end WTRU (606) may send a Direct Communication Accept (DCA) message to the Relay (604), wherein the DCA message may include one or more MAC addresses that it may use (Alternative A, Step 6a). The Relay (604) may select a MAC address for the target end WTRU (606) that is not conflicting with the MAC addresses used by other end WTRUs. The Relay (604) may send a PC5 signaling protocol stack (PC5-S) message to the target WTRU (606), including the chosen unique MAC address (Alternative A, Step 7a). The PC5-S message may be a new message (e.g., Set MAC address) or a modified existing message e.g., Link Modification Request. The target end WTRU (606) may send a PC5-S Response message to the Relay (604) acknowledging the selected MAC address to be used by the target end WTRU (Alternative A, Step 8a). The target end WTRU (606) may include the received selected MAC address.

Depicted as Alternative B, following Step 4, the Relay (604) may provide a list of MAC addresses. The Relay (604) may send a DSM Complete message to the target end WTRU (606), wherein the DSM Complete message may include source end WTRU MAC address and additionally may provide one or more MAC addresses that the target end WTRU (606) may use for the link with the relay (Alternative B, Step 5b). The target end WTRU (606) may select a MAC address from the list received from the Relay (604). The target end WTRU (606) may select a MAC address that is not conflicting with the MAC addresses used by its peer end WTRUs. The target WTRU (606) may send a Direct Communication Accept (DCA) message to Relay (604), wherein the DCA message may include target end WTRU's chosen MAC address (Alternative B, Step 6b).

Figure 7:
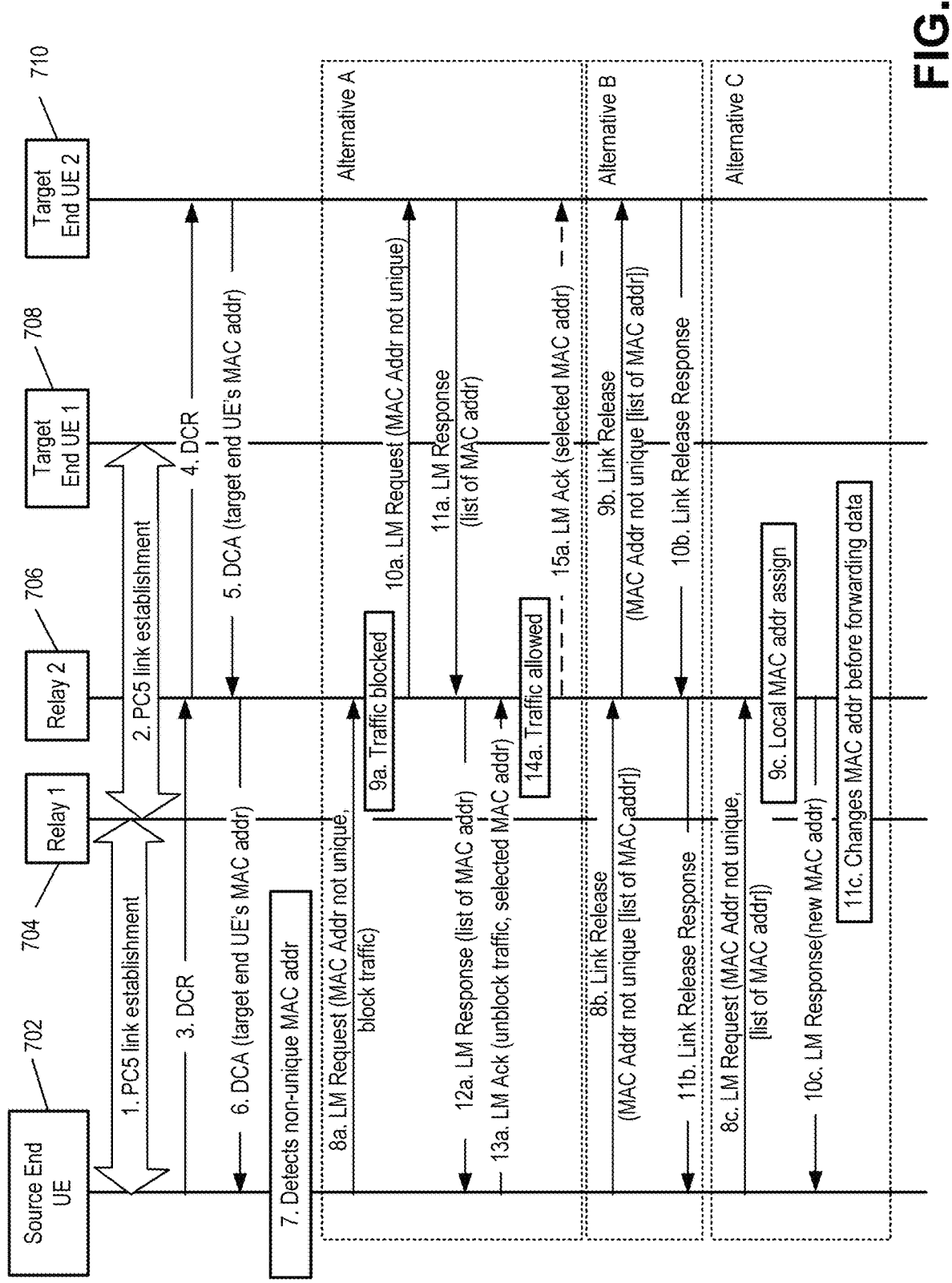
FIG. 7 depicts an example process for a Relay detecting that a source end WTRU's MAC address is conflicting with another MAC address.

FIG. 7 is an example depiction of a Relay detecting that a source end WTRU's MAC address conflicts with another MAC address. The source end WTRU (702) may establish a PC5 link with Relay1 (704) to reach target end WTRU1 (708) (Step 1). Relay 1 (704) may establish the PC5 link towards target end WTRU1 (708) (Step 2). The source end WTRU (702) may trigger PC5 link establishment with Relay2 (706) to reach target end WTRU2 (710) by sending a DCR message, for traffic (Step 3). Relay2 (706) may send a DCR message to target end WTRU2 (710) (Step 4). Target end WTRU2 (710) may send a DCA message including its MAC address to Relay2 (706) (Step 5). Relay2 (706) may send the DCA message including target end WTRU (710) MAC address to source end WTRU (702) (Step 6). The source end WTRU (702) may detect that the MAC address is not unique (e.g., MAC address conflict) (Step 7). For example, the MAC address used by target end WTRU2 (710) may be the same as the MAC address used by target end WTRU1 (702). This may be performed based on procedures described above.

Depicted as Alternative A, following Step 7, a new MAC address may be associated with the target WTRU (710). The source end WTRU (702) may send a modified Link Modification Request message to Relay2 (706) including an indication that the target end WTRU's (710) MAC address is not unique, an indication for Relay2 (706) to block traffic on this end-to-end PC5 link (Alternative A, Step 8a). Optionally, the source end WTRU (702) may provide one or more MAC addresses that the target end WTRU (710) may use as a replacement for the conflicting MAC address. Relay2 (706) may block/not forward the traffic on the PC5 link between the source end WTRU (702) and the Relay towards the target end WTRU2 (710) (and vice-versa) (Alternative A, Step 9a). Relay2 (706) may send a Link Modification Request message including an indication that the MAC address is not unique (Alternative A, Step 10a). Optionally, Relay2 (706) may provide one or more MAC addresses that the target end WTRU (710) may use as a replacement of the conflicting MAC address (as received at step 8a). Target end WTRU2 (710) may provide a list of MAC addresses on the LM Response message, requesting the source end WTRU (702) to make a MAC address selection (Alternative A, Step 11a). Alternatively, target end WTRU2 (710) may change its MAC address, e.g., may generate a new one. The target end WTRU (710) may send a Link Modification Response message including its new MAC address to the Relay (706). The Relay (706) may associate this MAC address with the PC5 link. Optionally, the target end WTRU (710) may select one from the list received at step 10, if any. Relay2 (706) may send a LM Response message to the source end WTRU (702) including the parameters as received at step 11a (Alternative A, Step 12a). The source end WTRU (702) may select a MAC address from the received list from the target end WTRU (710), and may send a LM Ack message to Relay2 (706) including an indication to unblock the traffic forwarding and an indication of the selected MAC address (Alternative A, Step 13a). Optionally, the source end WTRU (702) may validate the new target end WTRU's MAC address if received at step 12a. Relay2 (706), receiving an unblock traffic indication, may start handling the traffic forwarding between the source end WTRU (702) and target end WTRU2 (710) (Alternative A, Step 14a). Relay2 (706) may send a LM Ack message to target end WTRU2 (710) if a selected MAC address for the target end WTRU (710) is provided at step 13a and may associate it with the PC5 link with the target end WTRU (710) (Alternative A, Step 15a). Target end WTRU2 (710) may receive the LM Ack messages including the selected MAC address to be used by the target end WTRU (710) and associates it with the PC5 link.

Depicted as Alternative B, following Step 7, PC5 links may be released. The source end WTRU (702) may send a Link Release Request message to Relay2 (706) including an indication that the target end WTRU's MAC address is not unique (Alternative B, Step 8b). Optionally, a list of MAC addresses may be included. Relay2 (706) may send a Link Release Request message to target end WTRU2 (710), including the indication, and the list of MAC addresses if received (Alternative B, Step 9b). Target end WTRU2 (710) may keep track of the list of MAC addresses from the source end WTRU (702) to be used if another PC5 link is established with the source end WTRU (702). Target end WTRU2 (710) may send a Link Release Response message to Relay2 (706) and may release the PC5 link (Alternative B, Step 10b). Relay2 (706) may send a PC5 link Response message to the source end WTRU (702) and may release the PC5 link (Alternative B, Step 11b). Source end WTRU (702) may re-trigger the PC5 unicast link establishment to the target end WTRU (710) via the Relay (706). In this case, the target end WTRU (710) may select a MAC address from the list saved at step 10.

Depicted as Alternative C, following Step 7, local MAC addresses may be updated. The source end WTRU (702) may send a modified Link Modification Request message to Relay2 (706) including an indication that the target end WTRU's MAC address is not unique and optionally may provide one or more MAC addresses that the target end WTRU (710) may use as a replacement of the conflicting MAC address (Alternative C, Step 8c). Relay2 (706) may decide to change the target WTRU's MAC address to a new MAC address for communication with Source end WTRU (702) locally (Alternative C, Step 9c). Relay2 (706) may send a LM Response message to the source end WTRU (702) including the newly assigned MAC address (Alternative C, Step 10c). Whenever Relay2 (706) receives traffic from Source end WTRU (702) to target end WTRU (710) using the new MAC address assigned at step 9 as destination MAC address, Relay2 (706) may change the new MAC address to the target WTRU's MAC address which was received at step 5 (Alternative C, Step 11c). Whenever Relay2 (706) receives traffic from Target end WTRU (710) to Source end WTRU (702) using the target WTRU's MAC address which was received at step 5 as source MAC address, Relay2 (706) may change the target WTRU's MAC address to the new MAC address assigned at step 9 (Alternative C, Step 11c).

A target end WTRU may be identified using the target WTRU's MAC address and layer 2 (L2) identifier (ID) of the Relay WTRU. When the source end WTRU detects that a target end WTRU's MAC address is not unique (this may be performed based on procedures described above), the source end WTRU may utilizes the L2 ID of the Relay WTRU, which source end WTRU and target end WTRU are connected with, together with MAC address of the target end WTRU to identify User Info associated to the application. When downlink (DL) traffic is received, the source L2 ID/destination L2 ID and MAC address may be used to identify the associated application. When UL traffic is sent for the User associated to the target WTRU, source END WTRU refers to the associated L2 ID and MAC address to identify the relay WTRU to send the traffic with the MAC address of the target END WTRU.

Figure 8:
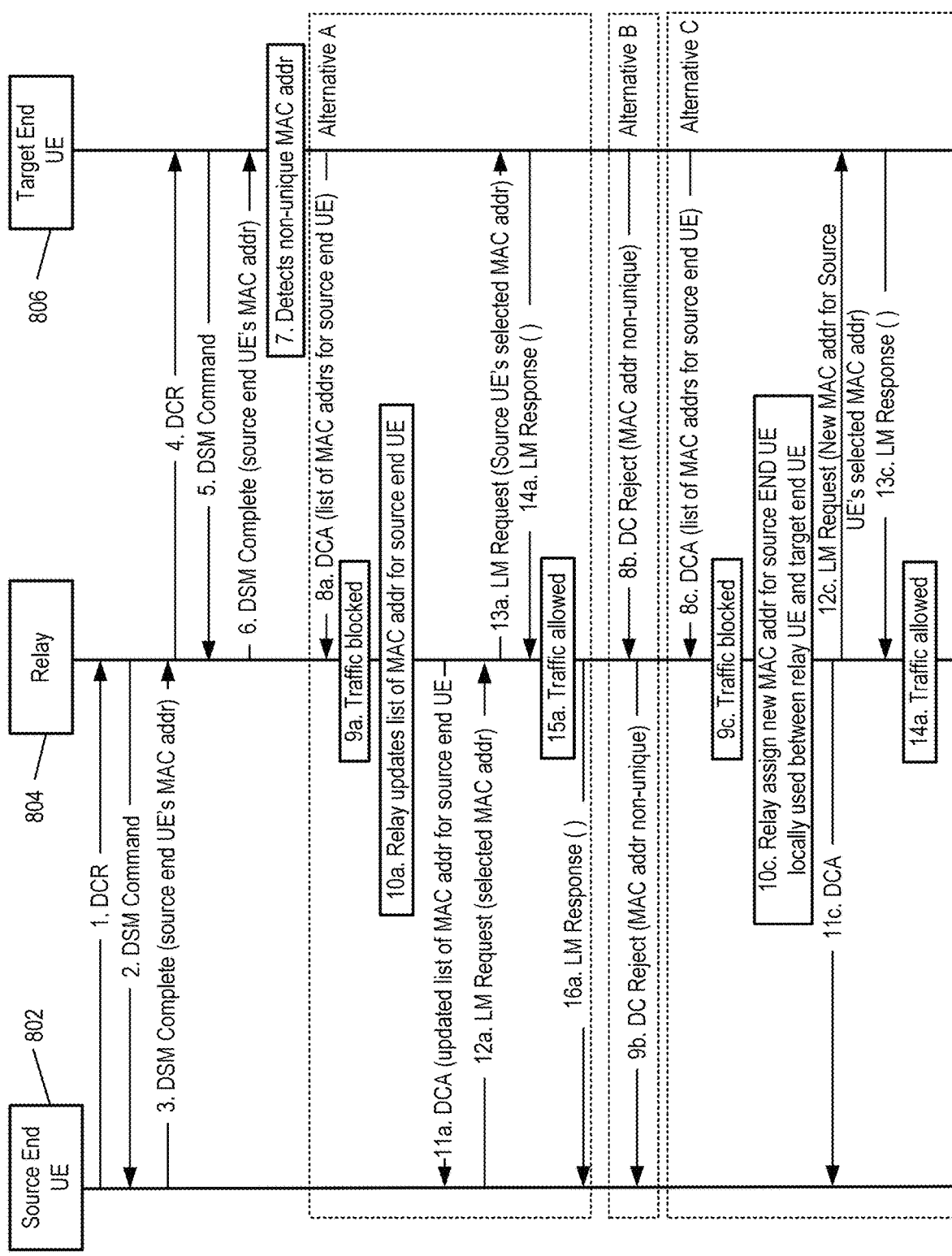
FIG. 8 depicts an example process for a target end WTRU detecting that a source end WTRU's MAC address is conflicting with another MAC address.

FIG. 8 is an example depiction of a target end WTRU detecting that a source end WTRU's MAC address conflicts with another MAC address. At step 1, Relay (804) may receive a direct communication request (DCR) message from source end WTRU (802), wherein the DCR message may comprise an indication of a request for the source end WTRU (802) to establish a link with the target end WTRU (506). The link may be configured to relay traffic to and from the source end WTRU (802) to the target end WTRU (806). The Relay (804) may receive a DCR message from the source end WTRU (802), for traffic (Step 1). The Relay (804) may send a DSM Command message to the source end WTRU (802) (Step 2). The Relay (804) may receive a DSM complete message from the source end WTRU (802), wherein the DSM complete message may comprise a MAC address associated with the source end WTRU )802). The Relay (804) may receive a DSM Complete message from source end WTRU (802), including a source end WTRU MAC address (Step 3). The Relay (804) may send a DCR message to the target end WTRU (806), for traffic (Step 4). The Relay (804) may receive a DSM Command message from the target end WTRU (806) (Step 5). The Relay (806) may send a DSM complete message to the target end WTRU (806), wherein the DSM complete message may comprise the MAC address associated with the source end WTRU (802). The Relay (804) may send a DSM Complete message to the target end WTRU (806), including a source end WTRU (802) MAC address (Step 6). The Target end WTRU (806) may detect that the MAC address is not unique (e.g., MAC address conflict) (Step 7). This may be performed based on procedures described above.

Depicted as Alternative A, following Step 7, the target end WTRU (806) may send a list of MAC addresses for the source end WTRU (802), and the Relay (804) may update the list. At step 8a of Alternative A, the Relay WTRU (804) may receive a direct communication accept (DCA) message from the target end WTRU (806), wherein the DCA message may comprise an indication of a conflict associated with MAC address associated with the source end WTRU (802), and wherein the DCA message may comprise a list of alternative MAC addresses for the source end WTRU (802). The Relay (804) may receive a DCA message including an indication of, for example, "MAC address not unique" and one or more MAC addresses for the source end WTRU (802) (Alternative A, Step 8a). Responsive to receiving the DCA message from the target end WTRU (806), the Relay (804) may block traffic between the source end WTRU (802) and the target end WTRU (806) (Alternative A, Step 9a). The Relay (804) may block/not forward the traffic on the PC5 link between the target end WTRU (806) and the Relay (804) towards the source end WTRU (802) (and vice-versa) (Alternative A, Step 9a). The Relay (904) may update the received list of alternative MAC addresses for the source end WTRU (802) (Alternative A, Step 10a). The Relay (804) may update the list of MAC addresses for the source end WTRU (802) received from the target end WTRU (806). For example, the Relay (802) may remove all MAC addresses that conflict with other registered WTRUs (e.g., that are already used by other end WTRUs) (Alternative A, Step 10a). The Relay (804) may send a DCA message including the updated MAC addresses for the source end WTRU (802) to the source end WTRU (802) (Alternative A, Step 11a). The Relay WTRU (804) may receive a modified link message (LM) from the source end WTRU (804), wherein the modified LM may comprise an indication of a selected MAC address, wherein the selected MAC address is selected from the updated list of MAC addresses (Alternative A, Step 12a). The source end WTRU (802) may send a modified Link Modification Request message including its selected MAC address from the list received on the DCA message (Alternative A, Step 12a). The Relay (804) may send a Link Modification Request message including the source end WTRU's selected MAC address (Alternative A, Step 13a). The target end WTRU (806) may associate the received source end WTRU's MAC address to the PC5 link and may send a Link Modification Response message (Alternative A, Step 14a). Responsive to receiving the LM response message, the Relay WTRU (804) may unblock traffic between the source end WTRU (802) and the target end WTRU (806). The Relay (804) may unblock/allow forwarding the traffic on the PC5 link between the target end WTRU (806) and the Relay (804) towards the source end WTRU (802) (and vice-versa) (Alternative A, Step 15a). The Relay (804) may send a LM Response message to the source end WTRU (802) (Alternative A, Step 16a).

Depicted as Alternative B, following Step 7, the target end WTRU (806) may reject the link establishment. The Relay (804) may receive a DC Reject message from the target end WTRU (806) with an indication that the MAC address is not unique, such as, for example, cause=MAC address not unique (Alternative B, Step 8b). The Relay (804) may send a DC Reject message to the source end WTRU (802) with an indication that the MAC address is not unique, such as, for example, cause=MAC address not unique (Alternative B, Step 9b).

Depicted as Alternative C, following Step 7, the source end WTRU (802) MAC address may be used only between the Relay (804) and the target WTRU (806). The Relay (804) may receive a DCA message including an indication that the MAC address is not unique, such as, for example, of "MAC address not unique" and one or more MAC addresses for the source end WTRU (802) (Alternative C, Step 8c). The Relay (804) may block/not forward the traffic on the PC5 link between the target end WTRU (806) and the Relay (804) towards the source end WTRU (802) (and vice-versa) (Alternative C, Step. 9c). The Relay (804) may decide to change source WTRU's MAC address to new MAC address, to be used only between the Relay (80) and the target end WTRU (806) during communication (Alternative C, Step. 10c). The selected new MAC address may be selected among the list of candidate MAC addresses received in step 8. The Relay (804) may send a DCA message to the source end WTRU (802) (Alternative C, Step. 11c). The Relay (804) may send a Link Modification Request message including new MAC address which may have been assigned at step 10 locally for the source end WTRU's selected MAC address (Alternative C, Step. 12c). The target end WTRU (806) may associate the received source end WTRU's MAC address to the PC5 link and may send a Link Modification Response message (Alternative C, Step. 13c). The Relay (804) may unblock/allow forwarding the traffic on the PC5 link between the target end WTRU (806) and the Relay (804) towards the source end WTRU (802) (and vice-versa) (Alternative C, Step. 14c).

Whenever the Relay (804) receives traffic from target end WTRU (806) to the source end WTRU (802) using the new MAC address assigned at Alternative C, Step 10c as the destination MAC address, the Relay (804) may change the new MAC address to the source WTRU's MAC address received at step 3. Whenever the Relay (804) receives traffic from the source end WTRU (802) to the target end WTRU (806) using the source WTRU's MAC address received at step 3 as the source MAC address, the Relay (804) may change the source WTRU's MAC address to the new MAC address assigned at Alternative C, Step 10c.

Figure 9:
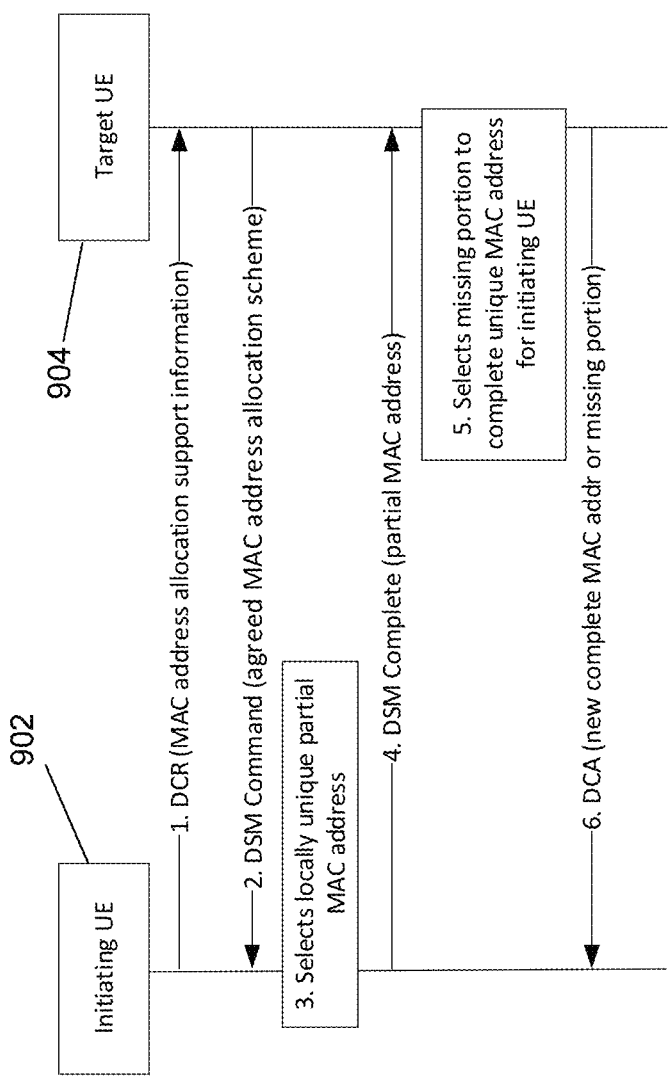
FIG. 9 depicts an example process for collision-free MAC address negotiation.

FIG. 9 depicts an example process for collision-free MAC address negotiation. FIG. 9 depicts an example process of two WTRUs negotiating a collision-free MAC address negotiation for exchange of traffic. An initiating WTRU (902) may decide to connect with a target WTRU (904) using MAC collision avoidance negotiation protocol. The initiating WTRU (902) may send a DCR message to the target WTRU (904) for traffic (Step 1). The message may include MAC address allocation support information (e.g., policy/scheme for MAC address allocation). The target WTRU (904) may send a direct security model (DSM) Command message to the initiating WTRU (902) (Step 2). The message may include the agreed upon MAC address allocation scheme. The MAC address allocation scheme may specify when or how the MAC address can be randomized (e.g., whether to preserve the Organizationally Unique Identifier (OUI) portion of the MAC address or randomize all permissible bits, update MAC address while connected). The target WTRU (904) may provide a partial MAC address for itself in the DSM Command message. The target WTRU (904) may ignore the MAC address allocation information element (e.g., to allow backward compatibility with legacy WTRUs). The Target WTRU (904) may reject the connection if its MAC address allocation policy conflicts (e.g., MAC randomization not allowed). Based on the MAC address allocation scheme, the initiating WTRU (902) may allocate a first portion of a MAC address to the initiating WTRU (902), wherein the allocated first portion of the MAC address does not conflict with other MAC addresses associated with the initiating WTRU (902). Based on the agreed MAC address allocation scheme, the initiating WTRU (902) may allocate a partial WTRU MAC address for itself (e.g., 5 most significant bytes) (Step 3). The initiating WTRU (902) may allocate the WTRU MAC randomly and/or pick from a MAC address range that may be provisioned/reserved by the network for the WTRU based on the MAC address allocation scheme. The initiating WTRU (902) may ensure the partial MAC address value does not conflict with other MAC addresses already in use by the initiating WTRU or by other WTRUs communicating with the initiating WTRU (902). Based on the agreed MAC address allocation scheme, the initiating WTRU (902) additionally may allocate a missing portion to complete the partial WTRU MAC address of the target WTRU (904), if received in the DSM Command message, or a first partial MAC address of the target WTRU (904) to be completed by the target WTRU (904). The initiating WTRU (902) may send a DSM complete message to the target WTRU (904), wherein the DSM complete message may comprise the first portion of the MAC address associated with the initiating WTRU (902). The initiating WTRU (902) may send a DSM Complete message to the target WTRU (904) including the partial WTRU MAC address of the initiating WTRU (902) (Step 4). The message may include the new complete MAC address of Target WTRU (904), or the initiating WTRU's portion needed to complete the MAC address of Target WTRU (904), or a first partial MAC address of the target WTRU (904), to be completed by the target WTRU (904). The complete MAC address associated with the initiating WTRU (902) may comprise a second portion of the complete MAC address, that when combined with the first portion of the MAC address, forms the complete MAC address associated with the initiating WTRU (902). The target WTRU (904) may allocate missing portion(s) to complete the partial WTRU MAC address of the initiating WTRU (902) (e.g., 1 least significant byte) to form a new full MAC address (Step 5). The target WTRU (904) may allocate missing portion(s) to compete the partial WTRU MAC address of the target WTRU (904). The target WTRU (904) may ensure that the newly formed MAC address value does not conflict with other MAC addresses already in use by the target WTRU (904) or by other WTRUs communicating with target WTRU (904). The target WTRU (904) may send a DCA message to the initiating WTRU (902) including the new complete MAC address of initiating WTRU (902), or the target WTRU's portion needed to complete the WTRU MAC address (e.g., least significant byte) (Step 6). The target WTRU (904) may include, in the DCA message to the initiating WTRU (902), the new complete MAC address of target WTRU (904), or a portion of the target WTRU's MAC address needed to complete the target WTRU (904) MAC address. The initiating and target WTRUs may use the newly formed MAC addresses to exchange traffic. The initiating WTRU (902) may use the complete MAC address associated with the initiating WTRU (902) to exchange traffic with the target WTRU (904).

Figure 10:
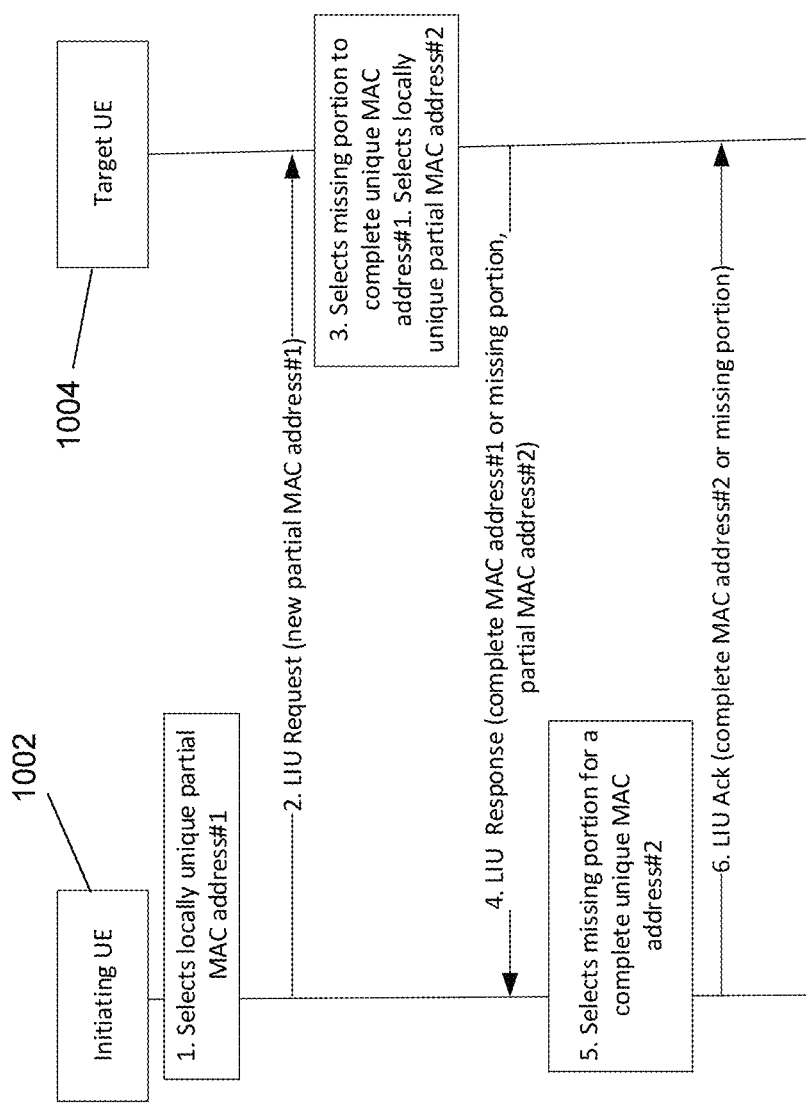
FIG. 10 depicts an example process for updating collision-free MAC addresses.
Figure 11:
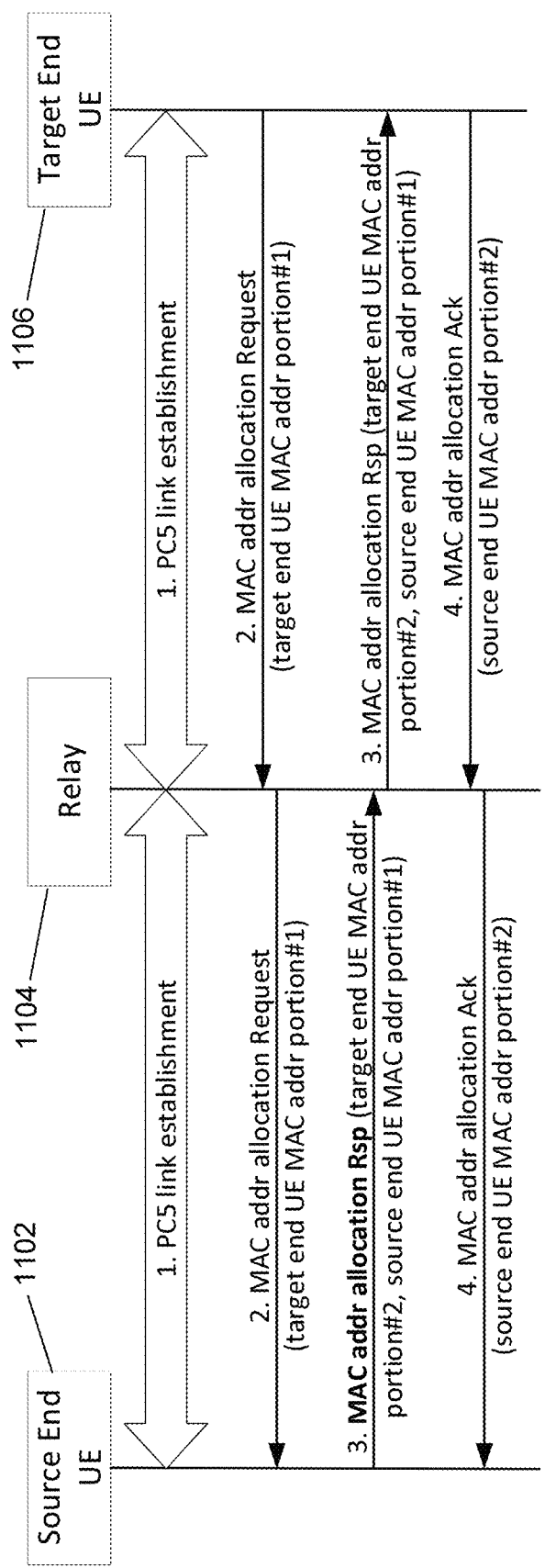
FIG. 11 depicts an example process for collision-free MAC address negotiation via a U2U Relay.

FIG. 10 depicts an example process for updating collision-free MAC addresses. FIG. 10 depicts an example process for establishing new collision-free MAC addresses between two communicating WTRUs. For privacy reasons, communicating WTRUs may change their MAC address periodically or upon an application trigger. Based on an agreed upon MAC address allocation scheme, an initiating WTRU (1002) may allocate a partial WTRU MAC address (Step 1). The initiating WTRU (1002) may ensure that the partial MAC address value does not conflict with other MAC addresses already in use by initiating WTRU (1002) or by other WTRUs communicating with the initiating WTRU (1002). The initiating WTRU (1002) may send a Link Identifier Update (LIU) request message to update its MAC address with the target WTRU (1004) (Step 2). The message may include the partial WTRU MAC address of the initiating WTRU (1002). The target WTRU (1004) may allocate missing portion to complete the partial WTRU MAC address of the initiating WTRU (1002) to form a new full MAC address (Step 3). The target WTRU (1004) may ensure that the newly formed MAC address value of the initiating WTRU (1002) does not conflict with other MAC addresses already in use by the target WTRU (1004) or by other WTRUs communicating with the target WTRU (1004). The Target WTRU (1004) may allocate a partial WTRU MAC address for itself. The target WTRU (1004) may ensure that the partial MAC address value does not conflict with other MAC addresses already in use by the target WTRU (1004). The target WTRU (1004) may send a LIU Response message to the initiating WTRU (1002) (Step 4). The message may include the new complete MAC address for the initiating WTRU (1002), or missing portion thereof. The message also may include the partial WTRU MAC address of the target WTRU (1004). The initiating WTRU (1002) may allocate missing portion(s) to complete the partial WTRU MAC address of the target WTRU (1004) to form a new full MAC address (Step 5). The initiating WTRU (1002) may ensure that the newly formed MAC address value of the target WTRU (1004) does not conflict with other MAC addresses already in use by the initiating WTRU (1002) or by other WTRUs communicating with the initiating WTRU (1002). The initiating WTRU (1002) may send a LIU Ack message to the target WTRU (1004) (Step 6). The message may include the new complete MAC address for the target WTRU (1004), or missing portion thereof. FIG. 11 depicts an example process for collision-free MAC address negotiation via a U2U Relay. MAC address negotiation may be used when communication is going through a U2U Relay. In this case, a MAC address allocation procedure may be run after establishment of the PC5 link.

FIG. 11 depicts an example process for collision-free MAC address negotiation via a U2U Relay. A procedure which may be initiated by a source end WTRU (1102) or target end WTRU (1106) is illustrated in FIG. 11, with the target end WTRU (1106) as the initiator. The source end WTRU (1102) and the Relay (1104) (e.g., U2U Relay) may establish a PC5 link (Step 1—left side). The Relay (1104) and target end WTRU (1106) establish a PC5 link (Step 1 —right side). The source or target end WTRU may decide to negotiate a MAC address with a collision avoidance negotiation protocol with the source end WTRU (1102) via the Relay (1104) (Step 2). The support for MAC address negotiation may be indicated in a DCR sent by the initiating end WTRU (e.g., either 1102 or 1106) and the Relay (1104) and accepted in the DCA from the peer end WTRU and the Relay (1104). The procedure may be triggered by either end WTRU (e.g., either 1102 or 1106) when receiving acceptance of MAC address negotiation (e.g., in DCA) from the Relay (1104) (and peer end WTRU). Once the PC5 link is established with the Relay (1104), the target end WTRU (1106) may trigger the MAC address allocation procedure with the source end WTRU (1102), via the Relay (1104). The target end WTRU (1102) may send a PC5 MAC Address allocation Request to the Relay (1104) including a partial WTRU MAC address for itself. The Relay (1104) may send the message to the source end WTRU (1102). The source end WTRU (1102) may allocate missing portion(s) to complete the partial WTRU MAC address of the target end WTRU (1106) to form a full MAC address (Step 3). The source end WTRU (1102) may allocate a partial WTRU MAC address for itself. The source end WTRU (1102) may send a PC5 MAC address allocation Response to the Relay (1104) including a partial WTRU MAC address for itself and the complete MAC address for the target end WTRU (1106), or missing portion thereof. The Relay (1104) may keep track of the target end WTRU (1106) complete MAC address associated to the PC5 link. The Relay (1104) may send the message to the target end WTRU (1106). The target end WTRU (1106) may keep track of its complete MAC address associated to the PC5 link. The target end WTRU (1106) may allocate missing portion(s) to complete the partial WTRU MAC address of the source end WTRU (1102) to form a full MAC address (Step 4). The target end WTRU (1106) may send a PC5 MAC address allocation Ack to the Relay including the complete MAC address for source end WTRU (1102), or missing portion thereof.

The Relay (1104) may keep track of the source end WTRU (1102) complete MAC address associated to the PC5 link. The Relay (1104) may send the message to the source end WTRU (1102). The source end WTRU (1102) may keep track of its complete MAC address associated to the PC5 link.

What is claimed is:

1. A first wireless transmit/receive unit (WTRU) comprising:
   a transceiver; and
   a processor configured to:
      send, via the transceiver, a direct communication request (DCR) message to a second WTRU, wherein the DCR message initiates establishment of a link between the first WTRU and the second WTRU, wherein the link is for relay traffic between the first WTRU and the second WTRU;
      receive, via the transceiver, a direct security mode (DSM) command message from the second WTRU;
      send, via the transceiver, a first response message to the second WTRU, wherein the first response message comprises an indication of a medium access control (MAC) address of the first WTRU;
      receive, via the transceiver, a direct communication (DC) reject message from the second WTRU, wherein the DC reject message comprises a cause code indicating that the MAC address of the first WTRU is not unique; and
      send a link modification message to the second WTRU, wherein the link modification message comprises an indication of a second MAC address of the first WTRU.

2. The first WTRU of claim 1, wherein the first response message comprises a DSM complete message.

3. The first WTRU of claim 1, wherein the DSM command message is configured to establish a secure link between the first WTRU and the second WTRU.

4. The first WTRU of claim 1, wherein MAC address of the first WTRU is being used by another WTRU associated with the second WTRU.

5. The first WTRU of claim 1, wherein the link modification message is for a second link established between the first WTRU and the second WTRU.

6. A method performed by a first wireless transmit/receive unit (WTRU), the method comprising:
   sending a direct communication request (DCR) message to a second WTRU, wherein the DCR message initiates establishment of a link between the first WTRU and the second WTRU, wherein the link is for relay traffic between the first WTRU and the second WTRU;
   receiving a direct security mode (DSM) command message from the second WTRU;
   sending a first response message to the second WTRU, wherein the first response message comprises an indication of a medium access control (MAC) address of the first WTRU;
   receiving a direct communication (DC) reject message from the second WTRU, wherein the DC reject message comprises a cause code indicating that the MAC address of the first WTRU is not unique; and
   sending a link modification message to the second WTRU, wherein the link modification message comprises an indication of a second MAC address of the first WTRU.

7. The method of claim 6, wherein the first response message comprises a DSM complete message.

8. The method of claim 6, wherein the DSM command message is configured to establish a secure link between the first WTRU and the second WTRU.

9. The method of claim 6, wherein the MAC address of the first WTRU is being used by another WTRU associated with the second WTRU.

10. The method of claim 6, wherein the link modification message is for a second link between the first WTRU and the second WTRU.

* * * * *